US012162279B2

(12) United States Patent
Shimamura

(10) Patent No.: US 12,162,279 B2
(45) Date of Patent: Dec. 10, 2024

(54) PRINTING APPARATUS

(71) Applicant: BROTHER KOGYO KABUSHIKI KAISHA, Nagoya (JP)

(72) Inventor: Yasuhiro Shimamura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 76 days.

(21) Appl. No.: 17/822,180

(22) Filed: Aug. 25, 2022

(65) Prior Publication Data

US 2023/0094405 A1 Mar. 30, 2023

(30) Foreign Application Priority Data

Sep. 30, 2021 (JP) ................................ 2021-161820

(51) Int. Cl.
*B41J 2/045* (2006.01)

(52) U.S. Cl.
CPC ......... *B41J 2/04546* (2013.01); *B41J 2/0451* (2013.01); *B41J 2/0455* (2013.01); *B41J 2/04551* (2013.01)

(58) Field of Classification Search
CPC .... B41J 2/04546; B41J 2/0451; B41J 2/0455; B41J 2/04551; B41J 2/0452; B41J 2/04541; B41J 2/04581
See application file for complete search history.

(56) References Cited

U.S. PATENT DOCUMENTS

2007/0146403 A1 6/2007 Sayama et al.
2007/0177169 A1 8/2007 Han
2008/0122888 A1 5/2008 Suzuki
2013/0083106 A1 4/2013 Tsukamoto
2013/0182025 A1* 7/2013 Yanaka ............... B41J 2/04541 347/10

(Continued)

FOREIGN PATENT DOCUMENTS

JP S5888469 A 6/1983
JP 2001-54947 A 2/2001

(Continued)

OTHER PUBLICATIONS

EP Office Action dated Jun. 25, 2024 from application EP 22 155 761.4.

(Continued)

*Primary Examiner* — Sharon Polk
(74) *Attorney, Agent, or Firm* — Scully, Scott, Murphy & Presser, PC

(57) ABSTRACT

There is provided a printing apparatus including: a nozzle configured to discharge a liquid by an energy generating element; a selector configured to select, based on a print job, a driving waveform corresponding to a printing method indicated by the print job, from a plurality of driving waveforms different from each other; a signal generator configured to generate a time division multiplex signal, based on data indicating the driving waveform selected by the selector; and a separator configured to separate a driving waveform signal indicating the driving waveform selected by the selector from the time division multiplex signal generated by the signal generator. The energy generating element is configured to be driven by the driving waveform signal separated by the separator.

14 Claims, 17 Drawing Sheets

(56) References Cited

U.S. PATENT DOCUMENTS

| | | | | |
|---|---|---|---|---|
| 2017/0113461 | A1 | 4/2017 | Netsu et al. | |
| 2018/0201012 | A1 | 7/2018 | Miyagishi | |
| 2018/0272705 | A1* | 9/2018 | Ono | B41J 2/04581 |
| 2019/0126611 | A1 | 5/2019 | Lahiri et al. | |
| 2021/0060935 | A1 | 3/2021 | Kashimura et al. | |
| 2022/0314617 | A1* | 10/2022 | Hiwada | B41J 2/14201 |

FOREIGN PATENT DOCUMENTS

| | | | |
|---|---|---|---|
| JP | 2008-126612 | A | 6/2008 |
| JP | 2010-64465 | A | 3/2010 |
| JP | 2010142978 | A | 7/2010 |
| JP | 2011-20330 | A | 2/2011 |
| JP | 2017080891 | A | 5/2017 |
| JP | 2017-113965 | A | 6/2017 |
| JP | 2019-512413 | A | 5/2019 |

OTHER PUBLICATIONS

Related U.S. Appl. No. 17/693,614, filed Mar. 14, 2022.
Official Action dated Nov. 24, 2023 from related application, namely, U.S. Appl. No. 17/693,614, filed Mar. 14, 2022.
Extended European Search Report dated Jul. 22, 2022 of EP Patent Application No. 22155761.4.
Notice of Reasons for Refusal dated Jan. 9, 2024 of Japanese Patent Application No. 2021-143754 with computer generated translation.
Related U.S. Appl. No. 17/693,677, filed Mar. 14, 2022.
Notice of Reasons for Refusal dated Jan. 9, 2024 received from the Japanese Patent Office in related JP 2021-161820 together with English language translation.

* cited by examiner

FIG. 5

Da $T_{ta}$

| ADDRESS X | TIME ta(X) |
|---|---|
| 8 | 2 μs |
| 7 | 1 μs |
| 6 | 2 μs |
| 5 | 1 μs |
| 4 | 5 μs |
| 3 | 1 μs |
| 2 | 5 μs |
| 1 | 1 μs |
| 0 | 2 μs |

$T_{va}$

| ADDRESS X | VOLTAGE |
|---|---|
| 8 | 0 |
| 7 | V1 |
| 6 | V2 |
| 5 | V1 |
| 4 | 0 |
| 3 | V1 |
| 2 | V2 |
| 1 | V1 |
| 0 | 0 |

Db $T_{tb}$

| ADDRESS X | TIME tb(X) |
|---|---|
| 4 | 5 μs |
| 3 | 1 μs |
| 2 | 9 μs |
| 1 | 1 μs |
| 0 | 4 μs |

$T_{vb}$

| ADDRESS X | VOLTAGE |
|---|---|
| 4 | 0 |
| 3 | V1 |
| 2 | V2 |
| 1 | V1 |
| 0 | 0 |

Dc $T_{tc}$

| ADDRESS X | TIME tc(X) |
|---|---|
| 4 | 11 μs |
| 3 | 1 μs |
| 2 | 5 μs |
| 1 | 1 μs |
| 0 | 2 μs |

$T_{vc}$

| ADDRESS X | VOLTAGE |
|---|---|
| 4 | 0 |
| 3 | V1 |
| 2 | V2 |
| 1 | V1 |
| 0 | 0 |

Dd $T_{td}$

| ADDRESS X | TIME td(X) |
|---|---|
| 4 | 5 μs |
| 3 | 1 μs |
| 2 | 5 μs |
| 1 | 1 μs |
| 0 | 8 μs |

$T_{vd}$

| ADDRESS X | VOLTAGE |
|---|---|
| 4 | 0 |
| 3 | V1 |
| 2 | V2 |
| 1 | V1 |
| 0 | 0 |

PRINTING APPARATUS

REFERENCE TO RELATED APPLICATIONS

This application claims priority from Japanese Patent Application No. 2021-161820 filed on Sep. 30, 2021. The entire content of the priority application is incorporated herein by reference.

BACKGROUND ART

There is a printer which generates first to fourth driving pulses having different amplitudes, as driving signals for driving a piezoelectric element of each of nozzles. The first to fourth driving pulses are continuously generated during one cycle for printing one pixel. One of the first to fourth driving pulses is selected and applied to the piezoelectric element of each of the nozzles. Each of the nozzles discharges or ejects an ink in an amount corresponding to the amplitude of the selected driving pulse so as to form a dot having a desired size.

DESCRIPTION

According to a first aspect of the present disclosure, there is provided a printing apparatus including:

- a nozzle configured to discharge a liquid by an energy generating element;
- a selector configured to select, based on a print job, a driving waveform corresponding to a printing method indicated by the print job, from a plurality of driving waveforms different from each other;
- a signal generator configured to generate a time division multiplex signal, based on data indicating the driving waveform selected by the selector; and
- a separator configured to separate a driving waveform signal indicating the driving waveform selected by the selector from the time division multiplex signal generated by the signal generator.

The energy generating element is configured to be driven by the driving waveform signal separated by the separator.

According to a second aspect of the present disclosure, there is provided a printing apparatus including:

- a nozzle configured to discharge a liquid by an energy generating element;
- a signal generator configured to generate a time division multiplex signal, transmittable via a single signal line, based on a plurality of pieces of data each indicating one of a plurality of driving waveforms different from each other; and
- a separator configured to separate a driving waveform signal indicating the one of the plurality of driving waveforms from the time division multiplex signal generated by the signal generator.

Both a first period of time and a second period of time are included in a same one cycle of the time division multiplex signal.

The second period of time is different from the first period of time.

A number of the data to be used by the signal generator so as to generate the time division multiplex signal during the first period of time is smaller than a number of the data to be used by the signal generator so as to generate the time division multiplex signal during the second period of time.

The energy generating element is configured to be driven by the driving waveform signal separated by the separator.

FIG. 5 is a conceptual diagram depicting an example of a time table and an example of a voltage table.

In the above-described printer, although the four driving pulses are continuously generated during one cycle, only one driving pulse is selected. On this account, the time, which is allotted to the three driving pulses that are not selected, is the waiting time of the nozzle.

The present disclosure has been made taking the foregoing circumstances into consideration, an object of which is to provide a printing apparatus which is capable of reducing the waiting time of a nozzle by adjusting the amplitude of a driving waveform applied to an energy generating element (energy application element).

In the printing apparatus according to an aspect of the present disclosure, the time division multiplex signal is generated based on the plurality of pieces of data each indicating one of the driving waveforms which are mutually different. The driving waveform signal which corresponds to any one of the mutually different driving signals is separated from the generated time division multiplex signal. The energy generating element is configured to be driven by the separated driving waveform signal. By separating any one of the driving waveform signals, it is possible to adjust the shape of the driving waveform to be applied to the energy generating element. Further, the one cycle for printing one pixel includes only a cycle of any one of the driving waveforms, and does not include a cycle of another waveform. Accordingly, it is possible to reduce the waiting time of the nozzle.

FIRST EMBODIMENT

Figure 1:
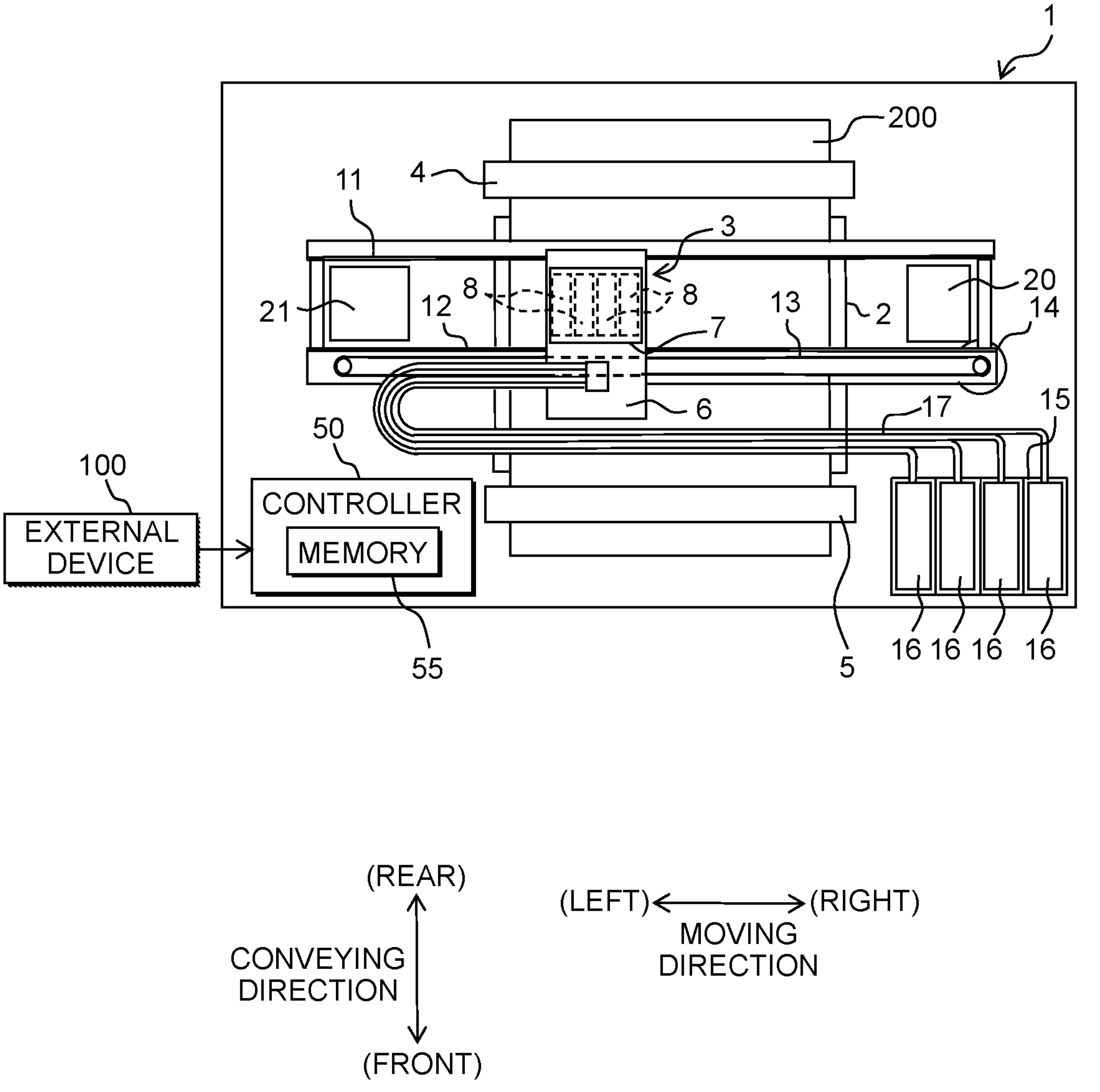
FIG. 1 is a plan view schematically depicting a printing apparatus.

A first embodiment of the present disclosure will be explained below on the basis of the drawings depicting a printing apparatus according to the first embodiment. FIG. 1 is a plan view schematically depicting the printing apparatus. In the following explanation, the front, rear, left, and right depicted in FIG. 1 are used. The front-rear direction corresponds to a conveying direction, and the left-right direction corresponds to a moving direction. Further, the surface side of FIG. 1 corresponds to the upper side and the underside corresponds to the lower side. In the explanation, the up-down direction is also used.

As depicted in FIG. 1, the printing apparatus 1 is provided with, for example, a platen 2, an ink discharge device 3, and conveying rollers 4, 5. Recording paper 200, which is a recording medium, is placed on the upper surface of the platen 2. The ink discharge device 3 records an image by discharging or ejecting an ink to the recording paper 200 placed on the platen 2. The ink discharge device 3 is provided with, for example, a carriage 6, a subtank 7, four ink-jet heads 8, and a circulating pump (not depicted).

Two guide rails 11, 12, which guide the carriage 6 and which extend in the left-right direction, are provided over or above the platen 2. An endless belt 13, which extends in the left-right direction, is connected to the carriage 6. The endless belt 13 is driven by a carriage driving motor 14. The carriage 6 is reciprocatively moved in the moving direction in an area opposed to or facing the platen 2 while being guided by the guide rails 11, 12 in accordance with the driving of the endless belt 13. More specifically, the carriage 6 performs a first movement in which the carriage 6 moves the heads 8 from a certain position to another position from the left to the right in the moving direction, and a second movement in which the carriage 6 moves the heads 8 from the another position to the certain position from the right to the left in the moving direction, in a state in which the carriage 6 supports the four ink-jet heads 8.

A cap 20 and a flushing receiver 21 are provided between the guide rails 11, 12. The cap 20 and the flushing receiver 21 are arranged under or below the ink discharge device 3. The cap 20 is arranged at right end portions of the guide rails 11, 12, and the flushing receiver 21 is arranged at left end portions of the guide rails 11, 12. Note that the cap 20 may be arranged at the left end portions of the guide rails 11 and 12 and that the flushing receiver 21 may be arranged at the right end portions of the guide rails 11 and 12.

The subtank 7 and the four ink-jet heads 8 are carried on the carriage 6, and the subtank 7 and the four ink-jet heads 8 are reciprocatively moved (reciprocate) in the moving direction together with the carriage 6. The subtank 7 is connected to a cartridge holder 15 via tubes 17. An ink cartridge 16 of one color or ink cartridges 16 of a plurality of colors (four colors in this embodiment) is/are installed to the cartridge holder 15. The four colors are exemplified, for example, by black, yellow, cyan, and magenta.

Four ink chambers (not depicted) are formed at the inside of the subtank 7. The four color inks, which are supplied from the four ink cartridges 16, are stored in the four ink chambers respectively.

The four ink-jet heads 8 are arranged side by side in the moving direction on the lower side of the subtank 7. A plurality of nozzles 80 (see FIG. 2) are formed in the lower surface of each of the ink-jet heads 8. One ink-jet head 8 corresponds to one color ink, and is connected to one ink chamber of the subtank 7. That is, the four ink-jet heads 8 correspond to the four color inks respectively, and are connected to the four ink chambers, respectively, of the subtank 7.

The ink-jet head 8 is provided with an ink supply port (not depicted in the drawings) and an ink discharge port (not depicted in the drawings). The ink supply port and the ink discharge port are connected to the ink chamber of the subtank 7, for example, via tubes. A circulating pump (not depicted in the drawings) intervenes between the ink supply port and the ink chamber.

The ink, which is fed from the ink chamber of the subtank 7 by the circulating pump, passes through the ink supply port to flow into the ink-jet head 8, and the ink is discharged (ejected) from the nozzles 80. The ink, which has not been discharged from the nozzles 80, passes through the ink discharge port, and the ink returns to the ink chamber of the subtank 7. The ink is circulated between the ink chamber of the subtank 7 and the ink-jet head 8. The four ink-jet heads 8 discharge the four color inks supplied from the subtank 7 onto the recording paper 200, while being moved in the moving direction together with the carriage 6.

As depicted in FIG. 1, the conveying roller 4 is arranged on the upstream side (rear side) in the conveying direction with respect to the platen 2. The conveying roller 5 is arranged on the downstream side (front side) in the conveying direction with respect to the platen 2. The two conveying rollers 4, 5 are synchronously driven by a motor (not depicted). The two conveying rollers 4, 5 convey the recording paper 200 placed on the platen 2 in the conveying direction orthogonal to the moving direction. The printing apparatus 1 is provided with a controller 50. The controller 50 is provided with, for example, a CPU or a logic circuit (for example, FPGA), and a memory (storage) 55 such as a nonvolatile memory and a RAM or the like. The controller 50 receives a print job and driving waveform data from an external device 100, and the controller 50 stores the print job and the driving waveform data in the memory 55. The controller 50 controls the driving of, for example, the ink discharge device 3 and the conveying roller 4 on the basis of the print job so as to execute the printing processing.

Figure 2:
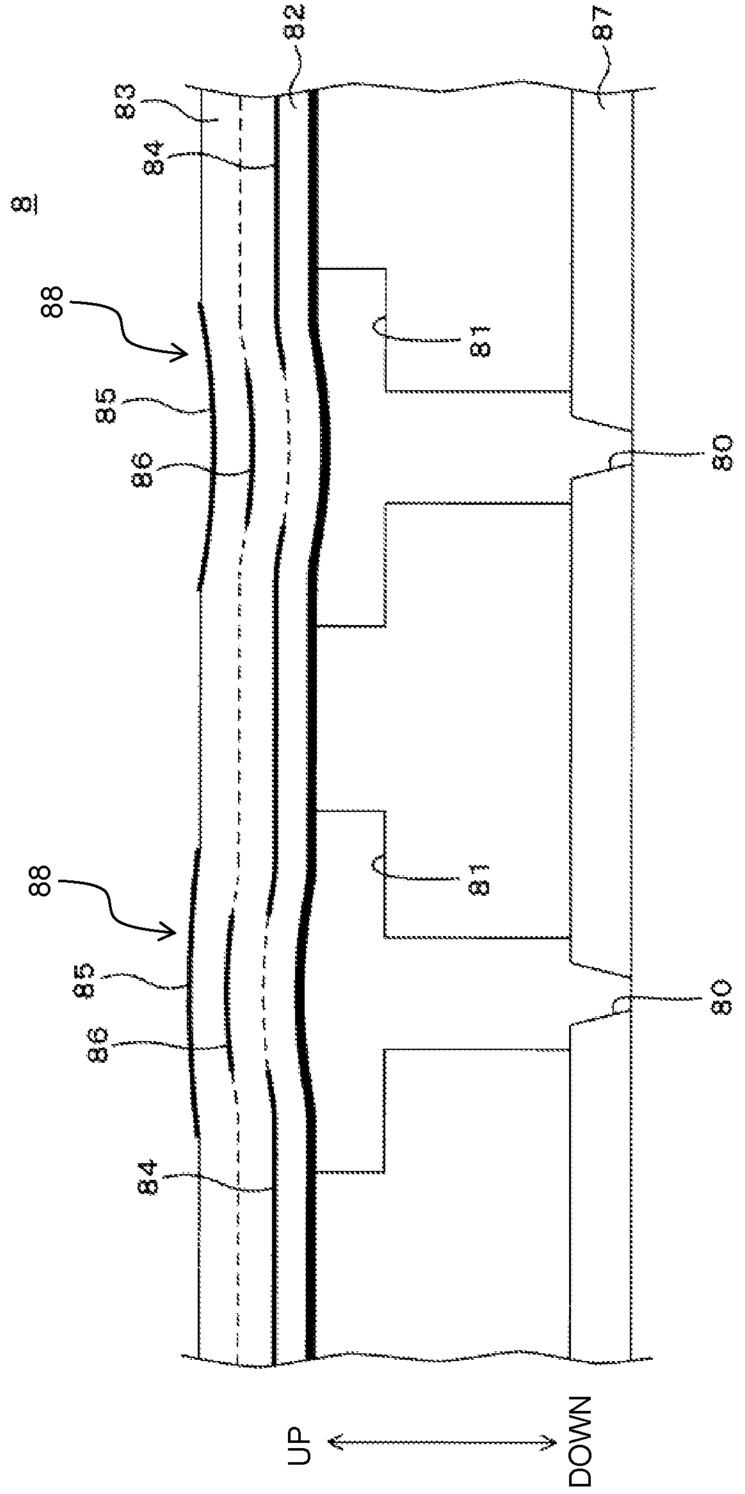
FIG. 2 is a partial enlarged cross-sectional view schematically depicting an ink-jet head.

FIG. 2 is a partial enlarged cross-sectional view schematically illustrative of each of the four ink-jet heads 8. Each of the ink-jet heads 8 is provided with a plurality of pressure chambers 81. The plurality of pressure chambers 81 constitute a plurality of pressure chamber arrays. A vibration plate 82 is formed on the upper side of the pressure chamber 81. A layered piezoelectric member 83 (an example of an "energy generating element") is formed on the upper side of the vibration plate 82. A first common electrode 84 is formed between the piezoelectric member 83 and the vibration plate 82 on the upper side of each of the plurality of pressure chambers 81.

A second common electrode 86 is provided at the inside of the piezoelectric member 83. The second common electrode 86 is arranged on the upper side of each of the pressure chambers 81 and on the upper side of the first common electrode 84. The second common electrode 86 is arranged at a position at which the second common electrode 86 does not face (is not opposed to) the first common electrode 84. An individual electrode 85 is formed on the upper surface of the piezoelectric member 83, at a location on the upper side of each of the plurality of pressure chambers 81. The individual electrode 85 vertically faces the first common electrode 84 and the second common electrode 86 with the piezoelectric member 83 intervening therebetween. The vibration plate 82, the piezoelectric member 83, the first common electrode 84, the individual electrode 85, and the second common electrode 86 constitute an actuator 88.

A nozzle plate 87 is provided under or below the respective pressure chambers 81. A plurality of nozzles 80, which vertically penetrate, are formed through the nozzle plate 87. Each of the plurality of nozzles 80 is arranged on the lower side of each of the plurality of pressure chambers 81. The plurality of nozzles 80 constitute a plurality of nozzle arrays which extend, respectively, along the pressure chamber arrays.

The first common electrode 84 is connected to a COM terminal, i.e., the ground in this embodiment. The second common electrode 86 is connected to a VCOM terminal. The VCOM voltage is higher than the COM voltage. The individual electrode 85 is connected to a switch group 54 (see FIG. 3). The High or Low voltage is applied to the individual electrode 85, which in turn deforms the piezoelectric member 83, and vibrates the vibration plate 82. The ink in the pressure chamber 81 is discharged via the nozzle 80 in accordance with the vibration of the vibration plate 82.

Figure 3:
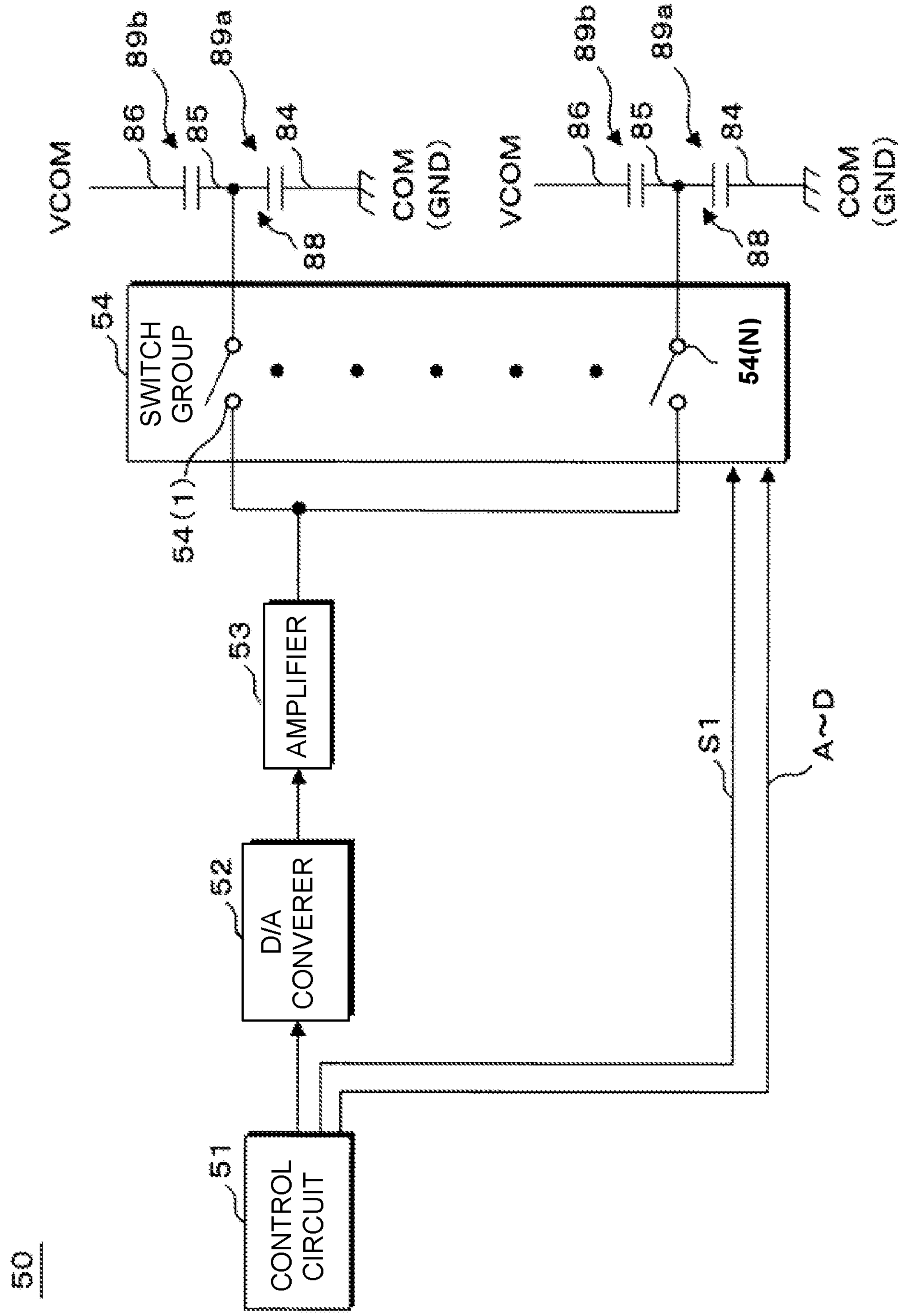
FIG. 3 is a block diagram of a controller.

FIG. 3 is a block diagram of the controller 50. The controller 50 is provided with a control circuit 51, a digital-analog converter (D/A converter) 52, an amplifier 53 and a switch group 54.

The digital-analogue converter 52 converts a digital signal into an analog signal. The amplifier 53 amplifies the analog signal. The switch group 54 is provided with a plurality of n-th switches 54(*n*) (n=1, 2, . . . , N). Each of the plurality of n-th switches 54(*n*) is constructed, for example, by an analog switch IC. One end of each of the plurality of nth switches 54(*n*) is connected to the amplifier 53 via a common bus. The other end of each of the plurality of n-th switches 54(*n*) is connected to the individual electrode 85 which corresponds to one of the plurality of nozzles 80. In other words, one piece of the n-th switch 54(*n*) is provided with respect to one piece of the actuator 88.

A first capacitor 89*a* is constructed by the individual electrode 85, the first common electrode 84, and the piezoelectric member 83. A second capacitor 89*b* is constructed by the individual electrode 85, the second common electrode 86, and the piezoelectric member 83.

Figure 4:
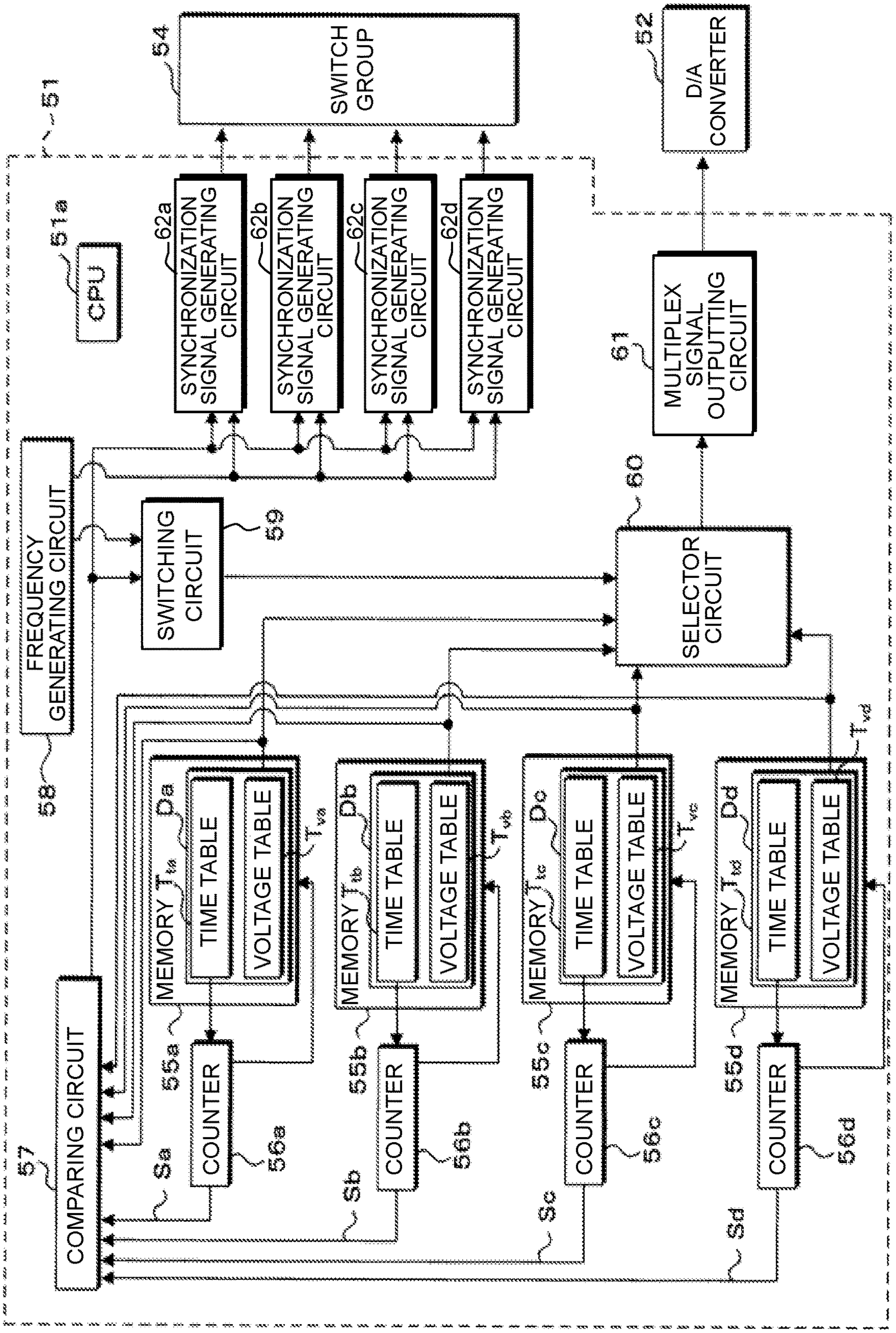
FIG. 4 is a block diagram of a control circuit.

FIG. 4 is a block diagram of the control circuit 51. The control circuit 51 is provided with a CPU 51*a*, four memories 55*a* to 55*d*, four counters 56*a* to 56*d*, a comparing circuit (a comparator) 57, a frequency generating circuit 58, a switching circuit 59 (an example of "a switcher" and/or "a selection signal outputting circuit"), a selector circuit 60, a multiplex signal outputting circuit 61 and four synchronization signal generating circuits 62*a* to 62*d*.

Driving waveform data Da to Dd are stored, respectively, in the memories 55*a* to 55*d*. Each of the driving waveform data Da to Dd is data indicating a voltage waveform to be applied to the individual electrode 85, namely, a driving waveform for driving the actuator 88, and is quantized data. The respective driving waveform data Da to Dd indicate mutually different driving waveforms.

FIG. 5 is the conceptual view depicting an example of time tables $T_{ta}$ to $T_{td}$ and voltage tables $T_{va}$ to $T_{vd}$. The memory 55*a* stores the driving waveform data Da. The driving waveform data Da includes the time table $T_{ta}$ and the voltage table $T_{va}$. In the time table $T_{ta}$, a time ta(X) associated with an address X (X=0, 1, 2, . . . ) is stored. In the present embodiment, ta(0) to ta(8) are, respectively, 2 μs, 1 μs, 5 μs, 1 μs, 5 μs, 1 μs, 2 μs, 1 μs and 2 μs. In the voltage table $T_{va}$, a voltage value Va(X) associated with the address X is stored. In the present embodiment, Va(0) to Va(8) are, respectively, 0, V1, V2, V1, 0, V1, V2, V1 and 0. V2 is a voltage value greater than V1. V1 is represented by a numerical value, and is, for example, 256. V2 is represented by a numerical value, and is, for example, 512.

The memory 55*b* stores the driving waveform data Db. The driving waveform data Db includes the time table $T_{tb}$ and the voltage table $T_{vb}$. In the time table $T_{tb}$, a time tb(X) associated with the address X is stored. In the present embodiment, tb(0) to tb(4) are, respectively, 4 μs, 1 μs, 9 μs, 1 μs and 5 μs. In the voltage table $T_{vb}$, a voltage value Vb(X) associated with the address X is stored. In the present embodiment, Vb(0) to Vb(4) are, respectively, 0, V1, V2, V1 and 0.

The memory 55*c* stores the driving waveform data Dc. The driving waveform data Dc includes the time table $T_{tc}$ and the voltage table $T_{vc}$. In the time table $T_{tc}$, a time tc(X) associated with the address X is stored. In the present embodiment, tc(0) to tc(4) are, respectively, 2 μs, 1 μs, 5 μs, 1 μs and 11 μs. In the voltage table $T_{vc}$, a voltage value Vc(X) associated with the address X is stored. In the present embodiment, Vc(0) to Vc(4) are, respectively, 0, V1, V2, V1 and 0.

The memory 55*d* stores the driving waveform data Dd. The driving waveform data Dd includes the time table $T_{td}$ and the voltage table $T_{vd}$. In the time table $T_{td}$, a time td(X) associated with the address X is stored. In the present embodiment, td(0) to td(4) are, respectively, 8 μs, 1 μs, 5 μs, 1 μs and 5 μs. In the voltage table $T_{vd}$, a voltage value Vd(X) associated with the address X is stored. In the present embodiment, Vd(0) to Vd(4) are, respectively, 0, V1, V2, V1 and 0.

The CPU 51*a* causes the memory 55*a* to output, to the counter 56*a*, the times of the time table $T_{ta}$ in the order of the address, and causes the memory 55*a* to output, to the selector circuit 60 and the comparing circuit 57, the voltages of the voltage table $T_{va}$ in the order of the address. For example, the memory 55*a* stores the address X as a parameter. The CPU 51*a* sets the address X to be 0 (zero). The memory 55*a* refers to the address 0, and outputs ta(0) of the time table $T_{ta}$, namely, 2 μs, to the counter 56*a*; the counter 56*a*, into which ta(0) is inputted, outputs a comparison timing signal Sa to the comparing circuit 57. The counter 56*a* measures the inputted time 2 μs, and after the measurement, the counter 56*a* outputs an address increment signal Spa to the memory 55*a*. In a case that the address increment signal Spa is inputted to the memory 55*a*, the memory 55*a* increments the address X by 1 (one), refers to the address 1, and outputs ta(1) of the time table $T_{ta}$, namely, 1 μs, to the counter 56*a*. The counter 56*a*, into which ta(1) is inputted, outputs the comparison timing signal Sa to the comparing circuit 57. In such a manner, every time the time ta(X) is inputted from the time table $T_{ta}$, the counter 56*a* outputs the comparison timing signal Sa to the comparing circuit 57; every time the counter 56*a* completes the measurement of the time ta(X), the counter 56*a* outputs the address increment signal Spa to the memory 55*a*.

In a case that the CPU 51*a* sets the address X to be 0 (zero), the memory 55*a* outputs the voltage value Va(0) of the voltage table $T_{va}$, namely 0 (zero), to the selector circuit 60 and the comparing circuit 57. Afterwards, in a case that the address increment signal Spa is inputted to the memory 55*a*, the memory 55*a* increments the address X by 1 (one), and outputs the voltage value Va(1), namely V1, to the selector circuit 60 and the comparing circuit 57. In such a manner, in a case that the address X is set to be 0 (zero) and every time the address increment signal Spa is inputted to the memory 55*a*, the memory 55*a* outputs the voltage value of the voltage table $T_{va}$ to the selector circuit 60 and the comparing circuit 57. Namely, the memory 55*a* outputs the voltage value of the voltage table $T_{va}$, in the order of address, to the selector circuit 60 and the comparing circuit 57.

Similarly, the CPU 51*a* causes the memory 55*b* to 55*d* to output, respectively, the times tb(X) to td(X) of the time table $T_{ta}$ to $T_{td}$ to the counters 56_b_ to 56_d_, respectively, in the order of address; the counters 56_b_ to 56_d_ output, respectively, the timing signals Sb to Sd to the comparing circuit 57 every time the times tb(X) to td(X) are inputted, respectively, to the counter 56_b_ to 56_d_. Every time the time corresponding to the address X lapses, the counters 56_b_ to 56_d_ output, respectively, the address increment signals SPb to Spd to the memories 55_b_ to 55_d_, respectively.

Similarly, in a case that the address X is set to be 0 (zero) and every time the address increment signals Spb to Spd are inputted to the memories 55_b_ to 55_d_, respectively, the memories 55_b_ to 55_d_ output, respectively, the voltage values Vb(X) to Vd(X) of the voltage table $T_{va}$ to $T_{vd}$ to the selector circuit 60 and the comparing circuit 57. Namely, the memories 55_b_ to 55_d_ output, respectively, the voltage values Vb(X) to Vd(X) to the selector circuit 60 and the comparing circuit 57, in the order of address.

Figure 6:
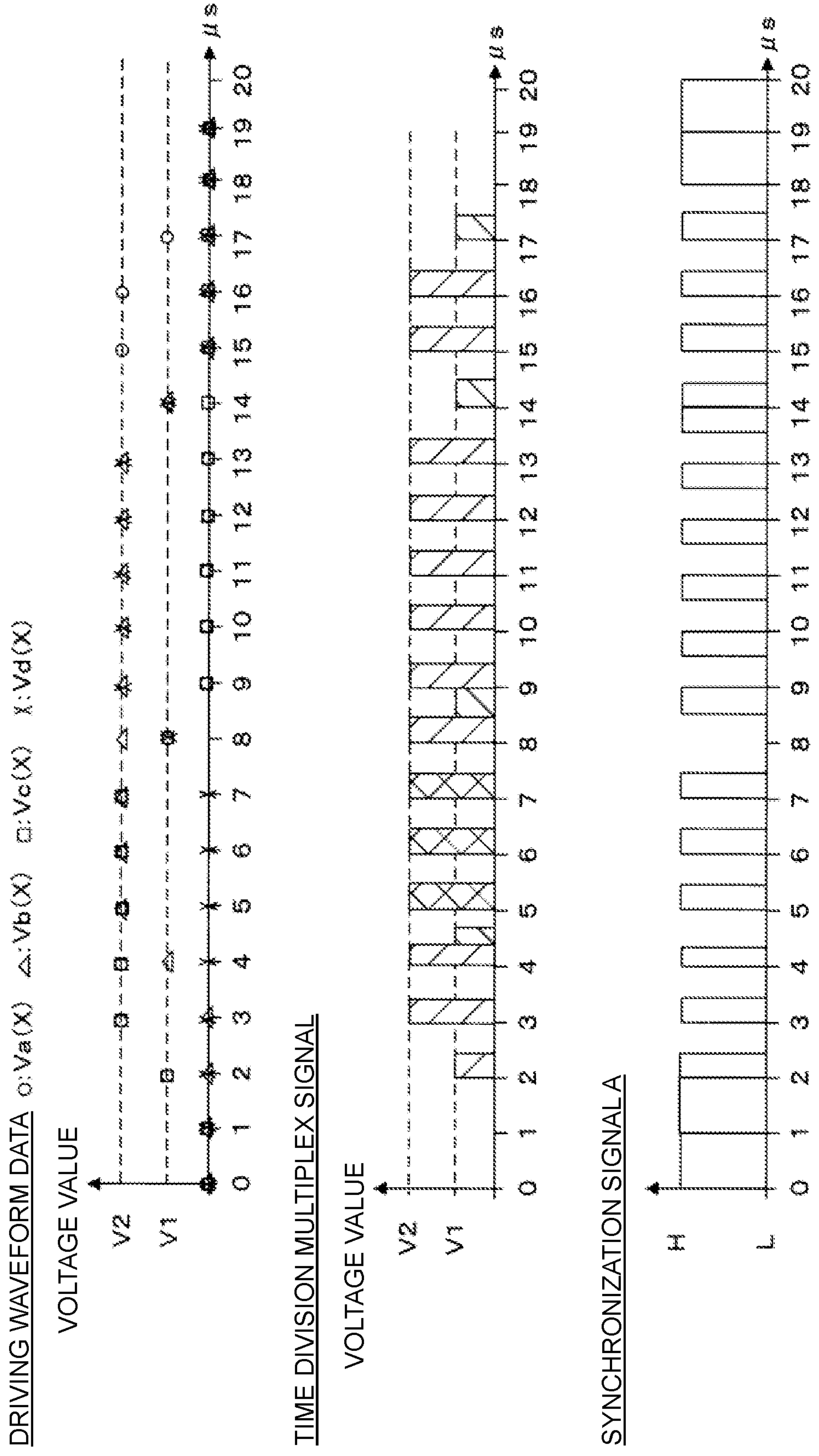
FIG. 6 is a graph of driving waveform data of one cycle which is plotted in time series, a graph indicating a time division multiplex signal, and a graph indicating a synchronization signal.
Figure 7:
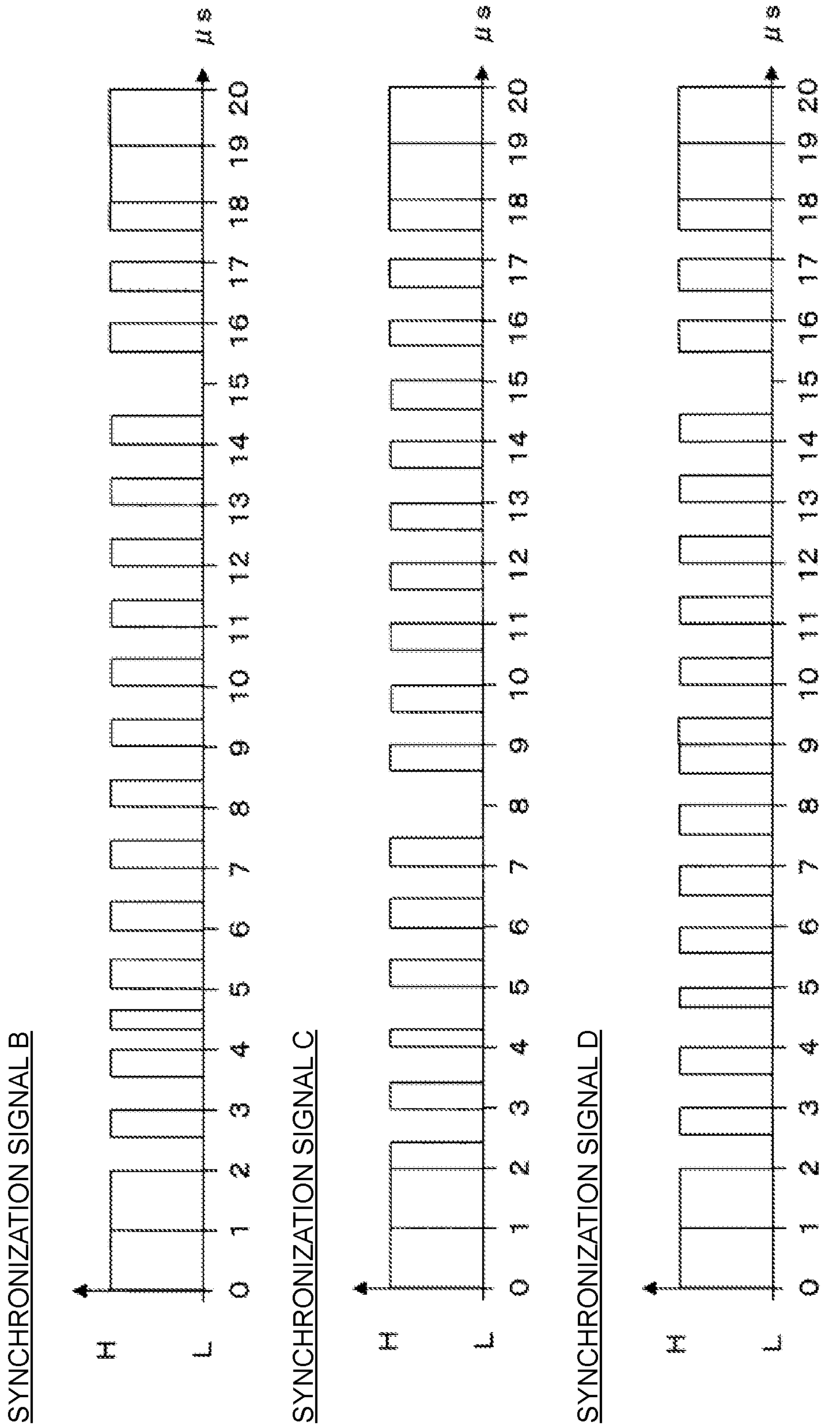
FIG. 7 is graphs indicating synchronization signals.
Figure 8:
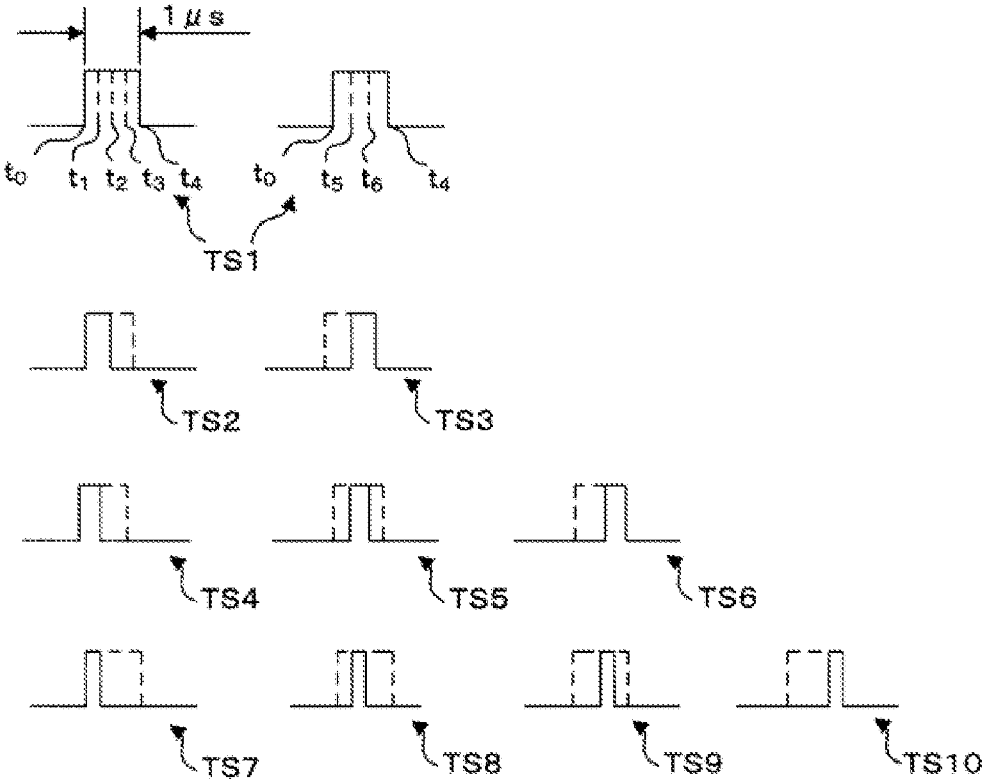
FIG. 8 is a view explaining time slots.

FIG. 6 includes a graph of the driving waveform data Da to Dd of one cycle plotted in time series, a graph indicating a time division multiplex signal, and a graph indicating a synchronization signal A. FIG. 7 includes graphs indicating synchronization signals B to D, respectively. FIG. 8 is a view explaining time slots.

An upper view of FIG. 6 is a graph of the driving waveform data Da to Dd plotted in time series, wherein the horizontal axis of the graph is time (μs), and the vertical axis of the graph is voltage value. A circle represents the voltage value Va(X) of the voltage table $T_{va}$, a triangle represents the voltage value Vb(X) of the voltage table $T_{vb}$, a square represents the voltage value Vc(X) of the voltage table $T_{vc}$, and a cross (x) represents the voltage value Vd(X) of the voltage table $T_{vd}$, each being corresponded to the time of the time table and plotted every 1 μs. In the following, "μs" is appropriately omitted regarding the plotted time (plotted point of time). The plot is 20 pieces of plots ranging from a point of time 0 (zero) to point of time 19. The voltage value of point of time k (k=0, 1, 2, . . . 19) indicates a voltage value in a range of point of time k to point of time k+1 μs. In FIG. 6, the period of time in the range of point of time 0 to point of time 20, namely, 20 μs is one cycle of the time division multiplex signal.

A middle view of FIG. 6 indicates a time division multiplex signal generated based on the driving waveform data Da to Dd, a lower view of FIG. 6, and FIG. 7 indicate the synchronization signals A to D generated, respectively, in the synchronization signal generating circuits 62_a_ to 62_d_. The synchronization signals A to D are each a pulse signal having a high level (H) interval (time period) and a low level (L) interval (time period). Here, the details of the time division multiplex signal will be conceptually explained. The driving waveform data Da has, conceptually, quantized data Ak (k=0, 1, 2, . . . K), the driving waveform data Db has, conceptually, quantized data Bk (k=0, 1, 2, . . . K), the driving waveform data Dc has, conceptually, quantized data Ck (k=0, 1, 2, . . . K), and the driving waveform data Dd has, conceptually, quantized data Dk (k=0, 1, 2, . . . K). In a case that the actuator 88 is to be driven, the control circuit 51 accesses the memory 55, obtains the driving waveform data Da, Db, Dc and Dd, and generates time series data. In the time series data, conceptually, data Ak, Bk, Ck, Dk are successively arranged while providing time intervals Δt; the data Ak, Bk, Ck and Dk are arranged in an order of A0, B0, C0, D0, A1, B1, C1, D1 . . . , AK, BK, CK and DK. The time series data is a digital signal. Note that the time interval Δt is the reciprocal of a predetermined sampling frequency. The quantized data Ak, Bk, Ck, Dk are arranged in the order of A0, B0, C0, D0, A1, B1, C1, D1, . . . , AK, BK, CK and DK for every time (at a time interval) corresponding to the reciprocal of the predetermined sampling frequency. In other words, the data length of the quantized data Ak, Bk, Ck, Dk is not more than a length corresponding to the reciprocal of the predetermined sampling frequency.

Further, the quantized data A0 is continuous with the quantized data B0, the quantized data B0 is continuous with the quantized data C0, and the quantized data C0 is continuous with the quantized data D0. In other words, the quantized data C0, the quantized data D0, any other quantized data, and any data of any other waveform are absent between the quantized data A0 and the quantized data B0. Further, the quantized data A0, the quantized data D0, any other quantized data, and any data of any other waveform are absent between the quantized data B0 and the quantized data C0. Further, the quantized data A0, the quantized data B0, any other quantized data, and any data of any other waveform are absent between the quantized data C0 and the quantized data D0.

The control circuit 51 outputs the time series data to the digital-analogue converter 52. As depicted in FIG. 3, the digital-analogue converter 52 converts the time series data into the analog signal, and outputs the converted analog signal to the amplifier 53. The amplifier 53 amplifies the inputted analog signal, and outputs the amplified analog signal to the switch group 54. As depicted in FIG. 3, the analog signal, which is amplified by the amplifier 53, constructs the time division multiplex signal. In the time division multiplex signal, it is assumed that a portion corresponding to data Ak−1 is a first portion, a portion corresponding to the data Ak is a second portion, a portion corresponding to data Bk−1 is a third portion and a portion corresponding to the data Bk is a fourth portion. On this assumption, the third portion is present (aligned) between the first portion and the second portion, and the second portion is present (aligned) between the third portion and the fourth portion. Note that a similar relationship holds also between the data Bk and the data Ck, a similar relationship holds also between the data Ck and the data Dk, and a similar relationship holds also between the data Dk and the data Ak. In other words, the first portion is continuous with the third portion, the third portion is continuous with the second portion, and the second portion is continuous with the fourth portion. That is, the second portion, the fourth portion, and any other waveform are absent between the first portion and the third portion in the time division multiplex signal. Further, the first portion, the fourth portion, and any other waveform are absent between the third portion and the second portion in the time division multiplex signal. Further, the first portion, the third portion, and any other waveform are absent between the second portion and the fourth portion in the time division multiplex signal. The control circuit 51, the digital-analogue converter 52, the amplifier 53, and the memory 55 construct a "signal generator".

FIG. 8 indicates, as time slots, TS1 to TS10 each having a pulse shape. Each of TS1 to TS10 has a high level interval and a low level interval, wherein the high level interval corresponds to a time during which the n-th switch 54(_n_) is closed, and the low level interval corresponds to a time during which the n-th switch 54(_n_) is opened. In FIG. 8, one time slot is indicated while being quadrisected (equally divided) into four segments by a point of time t1, a point of time t2 and a point of time t3, with a start point of time of one time slot being defined as "t0", and an end point of time of one time slot being defined as "t4". Further, in FIG. 8, one time slot is indicated while being trisected (equally divided) into three segments by a point of time t5 and a point of time t6, with a start point of time of one time slot being defined as “t0”, and an end point of time of one time slot being defined as “t4”.

As indicated in FIG. 8, TS1 is a high level interval between the point of time t0 to point of time t4, and does not have any low level interval. TS2 is a high level interval between point of time t0 and point of time t2, and is a low level interval between point of time t2 and point of time t4. TS3 is a high level interval between point of time t2 and point of time t4, and is a low level interval between point of time t0 and point of time t2. TS4 is a high level interval between point of time t0 and point of time t5, and is a low level interval between point of time t5 and point of time t4. TS5 is a high level interval between point of time t5 and t6, and is a low level interval each between point of time t0 and point of time t5 and between point of time t6 and point of time t4. TS6 is a high level interval between point of time t6 and point of time t4, and is a low level interval between point of time t0 and point of time t6. TS7 is a high level interval between point of time t0 and point of time t1, and is a low level interval between point of time t1 and point of time t4. TS8 is a high level interval between point of time t1 and point of time t2, and is a low level interval each between point of time t0 and point of time t1 and between point of time t2 to point of time t4. TS9 is a high level interval between point of time t2 and point of time t3, and is a low level interval each between point of time t0 and point of time t2 and between point of time t3 to point of time t4. TS10 is a high level interval between point of time t3 and point of time t4, and is a low level interval between point of time t0 and point of time t3.

TS1 to TS10 are classified into mutually different four sampling frequencies wherein TS1 corresponds to a first sampling frequency, TS2 and TS3 correspond to a second sampling frequency, TS4 to TS6 correspond to a third sampling frequency, and TS7 to TS10 correspond to a fourth sampling frequency. For example, in a case that the fourth sampling frequency corresponds to 24 MHz, the third sampling frequency corresponds to 18 MHz, the second sampling frequency corresponds to 12 MHz and the first sampling frequency corresponds to 6 MHz.

In a case that any one of the comparison timing signals Sa to Sd is inputted to the comparing circuit 57, the comparing circuit 57 compares the voltage values inputted, respectively, from the voltage tables $T_{va}$ to $T_{vd}$. The points of time at which any one of the comparison timing signals Sa to Sd is inputted to the comparing circuit 57 are the points of time 0 (zero), 2, 3, 4, 5, 8, 9, 14, 15, 17 and 18 in the upper view of FIG. 6. The comparing circuit 57 allocates a common one time slot with respect to same voltage values, and allocates mutually different time slots to mutually different voltage values. Note that in a case that any one of the comparison timing signals Sa to Sd is not inputted to the comparing circuit 57, namely, at each of a certain point of time among the points of time 1, 6, 7, 10 to 13, 16 and 19 in the upper view of FIG. 6, the comparing circuit 57 allocates a time slot, which is same as that allocated to a preceding point of time preceding the certain point of time by one, to each of the same voltage values.

In a case that there are four same voltage values, TS1 is allocated to each of the four same voltage values. In a case that there are three same voltage values, TS2 is allocated to each of the three same voltage values, and T3 is allocated to a remaining one voltage value; or TS3 is allocated to each of the three same voltage values, and T2 is allocated to a remaining one voltage value.

In a case that there are two same voltage values and that remaining two voltage values are mutually different, TS4 is allocated to each of the two same voltage values, and T5 and TS6 are allocated to remaining two voltage values, respectively; or TS5 is allocated to each of the two same voltage values, and T4 and TS6 are allocated to remaining two voltage values, respectively; or TS6 is allocated to each of the two same voltage values, and T4 and TS5 are allocated to remaining two voltage values, respectively.

In a case that two voltage values are a first voltage value, that remaining two voltage values are a second voltage value and that the first voltage value and the second voltage value are different from each other, TS2 is allocated to the first voltage value, and TS3 is allocated to the second voltage value.

In a case that four voltage values are mutually different, TS7 to TS10 are allocated, respectively, to the four different voltage values.

The comparing circuit 57 associates the time slots with the respective voltage values Va(X) to Vd(X), and outputs the time slots and the respective voltage values Va(X) to Vd(X) which are associated with each other to the switching circuit 59 and the respective synchronization signal generating circuits 62*a* to 62*d*. The frequency generating circuit 58 generates a reference frequency (24 MHz in the present embodiment), and outputs the reference frequency to the switching circuit 59 and the respective synchronization signal generating circuits 62*a* to 62*d*.

For example, as depicted in the upper view of FIG. 6, at the point of time 0, the voltage values Va(X) to Vd(X) are each 0 (zero). In this situation, the comparing circuit 57 associates TS1 with the voltage values Va(X) to Vd(X), and outputs TS1 and the voltage values Va(X) to Vd(X) which are associated with each other to the switching circuit 59 and the respective synchronization signal generating circuits 62*a* to 62*d*. The switching circuit 59 selects one voltage value from the four voltage values Va(X) to Vd(X), for example, the voltage value Va(X). The selection is performed, for example, based on a priority order which is previously set. In a case that same voltage values are included at a certain point of time, for example, a priority order of Va(X)>Vb(X)>Vc(X) and Vd(X) is previously set, and a voltage value of which priority is highest is set among the same voltage values. Note that the order of priority may be appropriately set, the priority of Vb(X), Vc(X) or Vd(X) may be made the highest, or the order of priority may be set in accordance with a magnitude of usage frequency. In the following, the selection is made in a similar method in a case of selecting any one voltage value among the same voltage values.

In a case that the switching circuit 59 selects one voltage value, the switching circuit 59 generates a frequency of 6 MHz based on the reference frequency and TS1. The switching circuit 59 associates TS1, the frequency of 6 MHz and the voltage value Va(X) with each other, and outputs TS1, the frequency of 6 MHz and the voltage value Va(X) which are associated with each other to the selector circuit 60. As depicted in the middle view of FIG. 6, the selector circuit 60 refers to the voltage value Va(X) inputted from the switching circuit 59, selects the voltage value Va(X) from the four voltage values Va(X) to Vd(X) inputted from the voltage tables $T_{va}$ to $T_{vd}$, respectively, and generates a signal of which voltage value is 0 (zero) during a period of time (time) from the point of time 0 (zero) to the point of time 1 μs. In other words, the control circuit 51 generates a time division multiplex signal including a driving waveform signal which collates (combines or collects) the four voltage values of the voltage values Va(X) to Vd(X) to one.

For example, as depicted in the upper view of FIG. 6, the voltage values Va(X) and Vc(X) are both V1 and the voltage values Vb(X) and Vd(X) are both 0 (zero) at the point of time 2. In this situation, the comparing circuit 57 associates TS2 and the voltage values Va(X) and Vc(X), and outputs TS2 and the voltage values Va(X) and Vc(X) which are associated with each other to the switching circuit 59 and the synchronization signal generating circuits 62*a* to 62*d*; and the comparing circuit 57 associates TS3 and the voltage values Vb(X) and Vd(X), and outputs TS3 and the voltage values Vb(X) and Vd(X) which are associated with each other to the switching circuit 59 and the synchronization signal generating circuits 62*a* to 62*d*. The switching circuit 59 selects one voltage value from the two voltage values Va(X) and Vc(X), for example, the voltage value Va(X), and selects one voltage value from the two voltage values Vb(X) and Vd(X), for example, the voltage value Vb(X). The switching circuit 59 generates, with respect to the voltage value Va(X), a frequency of 12 MHz, based on the reference frequency and TS2. The switching circuit 59 generates, with respect to the voltage value Vb(X), a frequency of 12 MHz, based on the reference frequency and TS3. The switching circuit 59 associates TS2, the frequency of 12 MHz and the voltage value Va(X) with each other, and outputs TS2, the frequency of 12 MHz and the voltage value Va(X) which are associated with each other to the selector circuit 60; and the switching circuit 59 associates TS3, the frequency of 12 MHz and the voltage value Vb(X) with each other, and outputs TS3, the frequency of 12 MHz and the voltage value Vb(X) which are associated with each other to the selector circuit 60.

As depicted in the middle view of FIG. 6, the selector circuit 60 refers to the voltage value Va(X) inputted thereinto from the switching circuit 59, selects the voltage value Va(X) from the four voltage values Va(X) to Vd(X) inputted from the voltage tables $T_{va}$ to $T_{vd}$, respectively, and generates a signal of which voltage value is V1 during a period of time from the point of time 2 μs to the point of time 2.5 μs. The selector circuit 60 refers to the voltage value Vb(X) inputted thereinto from the switching circuit 59, selects the voltage value Vb(X) from the four voltage values Va(X) to Vd(X) inputted from the voltage tables $T_{va}$ to $T_{vd}$, respectively, and generates a signal of which voltage value is 0 (zero) during a period of time from the point of time 2.5 μs to the point of time 3 μs. In other words, the control circuit 51 generates a time division multiplex signal including a driving waveform signal which collates the two voltage values of the voltage values Va(X) and Vc(X) to one, and a driving waveform signal which collates the two voltage values of the voltage values Vb(X) and Vd(X) to one.

For example, as depicted in the upper view of FIG. 6, the voltage values Va(X) and Vc(X) are both V2, the voltage value Vb(X) is V1, and the voltage value Vd(X) is 0 (zero) at the point of time 4. In this situation, the comparing circuit 57 associates TS4 and the voltage values Va(X) and Vc(X), and outputs TS4 and the voltage values Va(X) and Vc(X) which are associated with each other to the switching circuit 59 and the respective synchronization signal generating circuits 62*a* to 62*d*; and the comparing circuit 57 associates TS5 and the voltage value Vb(X), and outputs TS5 and the voltage value Vb(X) which are associated with each other to the switching circuit 59 and the respective synchronization signal generating circuits 62*a* to 62*d*. The comparing circuit 57 associates TS6 and the voltage value Vd(X), and outputs TS6 and the voltage value Vd(X) which are associated with each other to the switching circuit 59 and the respective synchronization signal generating circuits 62*a* to 62*d*. The switching circuit 59 selects one voltage value from the two voltage values Va(X) and Vc(X), for example, the voltage value Va(X). The switching circuit 59 selects the voltage values Vb(X) and Vd(X). The switching circuit 59 generates, with respect to the voltage value Va(X), a frequency of 18 MHz, based on the reference frequency and TS4. The switching circuit 59 generates, with respect to the voltage value Vb(X), a frequency of 18 MHz, based on the reference frequency and TS5. The switching circuit 59 generates, with respect to the voltage value Vd(X), a frequency of 18 MHz, based on the reference frequency and TS6. The switching circuit 59 associates TS4, the frequency of 18 MHz and the voltage value Va(X) with each other, and outputs TS4, the frequency of 18 MHz and the voltage value Va(X) which are associated with each other to the selector circuit 60; the switching circuit 59 associates TS5, the frequency of 18 MHz and the voltage value Vb(X) with each other, and outputs TS5, the frequency of 18 MHz and the voltage value Vb(X) which are associated with each other to the selector circuit 60; and the switching circuit 59 associates TS6, the frequency of 18 MHz and the voltage value Vd(X) with each other, and outputs TS6, the frequency of 18 MHz and the voltage value Vd(X) which are associated with each other to the selector circuit 60.

As depicted in the middle view of FIG. 6, the selector circuit 60 refers to the voltage value Va(X) inputted thereinto from the switching circuit 59, selects the voltage value Va(X) from the four voltage values Va(X) to Vd(X) inputted from the voltage tables $T_{va}$ to $T_{vd}$, respectively, and generates a signal of which voltage value is V2 during a period of time from the point of time 4 μs to the point of time 4+(⅓) μs. The selector circuit 60 refers to the voltage value Vb(X) inputted thereinto from the switching circuit 59, selects the voltage value Vb(X) from the four voltage values Va(X) to Vd(X) inputted from the voltage tables $T_{va}$ to $T_{vd}$, respectively, and generates a signal of which voltage value is V1 during a period of time from the point of time 4+(⅓) μs to the point of time 4+(⅔) μs. The selector circuit 60 refers to the voltage value Vd(X) inputted thereinto from the switching circuit 59, selects the voltage value Vd(X) from the four voltage values Va(X) to Vd(X) inputted from the voltage tables $T_{va}$ to $T_{vd}$, respectively, and generates a signal of which voltage value is 0 (zero) during a period of time from the point of time 4+(⅔) μs to the point of time 5 μs. In other words, the control circuit 51 generates a time division multiplex signal including a driving waveform signal which collates the two voltage values of the voltage values Va(X) and Vc(X) to one, a driving waveform signal indicating the voltage value Vb(X), and a driving waveform signal indicating the voltage value Vd(X).

For example, as depicted in the upper view of FIG. 6, the voltage values Va(X), Vb(X) and Vd(X) are each V1 and the voltage value Vc(X) is 0 (zero) at the point of time 14. In this situation, the comparing circuit 57 associates TS2 and the voltage values Va(X), Vb(X) and Vd(X), and outputs TS2 and the voltage values Va(X), Vb(X) and Vd(X) which are associated with each other to the switching circuit 59 and the respective synchronization signal generating circuits 62*a* to 62*d*; and the comparing circuit 57 associates TS3 and the voltage value Vc(X), and outputs TS3 and the voltage value Vc(X) which are associated with each other to the switching circuit 59 and the respective synchronization signal generating circuits 62*a* to 62*d*. The switching circuit 59 selects one voltage value from the three voltage values Va(X) Vb(X) and Vd(X), for example, the voltage value Va(X). The switching circuit 59 selects the voltage value Vc(X). The switching circuit 59 generates, with respect to the voltage value Va(X), a frequency of 12 MHz, based on the reference frequency and TS2. The switching circuit 59 generates, with respect to the voltage value Vc(X), a frequency of 12 MHz, based on the reference frequency and TS3. The switching circuit 59 associates TS2, the frequency of 12 MHz and the voltage value Va(X) with each other, and outputs TS2, the frequency of 12 MHz and the voltage value Va(X) which are associated with each other to the selector circuit 60. The switching circuit 59 associates TS3, the frequency of 12 MHz and the voltage value Vc(X) with each other, and outputs TS3, the frequency of 12 MHz and the voltage value Vc(X) which are associated with each other to the selector circuit 60.

As depicted in the middle view of FIG. 6, the selector circuit 60 refers to the voltage value Va(X) inputted thereinto from the switching circuit 59, selects the voltage value Va(X) from the four voltage values Va(X) to Vd(X) inputted from the voltage tables $T_{va}$ to $T_{vd}$, respectively, and generates a signal of which voltage value is V1 during a period of time from the point of time 14 μs to the point of time 14.5 μs. The selector circuit 60 refers to the voltage value Vc(X) inputted thereinto from the switching circuit 59, selects the voltage value Vc(X) from the four voltage values Va(X) to Vd(X) inputted from the voltage tables $T_{va}$ to $T_{vd}$, respectively, and generates a signal of which voltage value is 0 (zero) during a period of time from the point of time 14.5 μs to the point of time 15 μs. In other words, the control circuit 51 generates a time division multiplex signal including a driving waveform signal which collates the three voltage values of the voltage values Va(X), Vb(X) and Vd(X) to one, and a driving waveform signal which indicates the voltage value Vc(X).

As described above, the voltage value used for generating the time division multiplex signal during the period of time from the point of time 0 to the point of time 1 μs included in one cycle of the time division multiplex signal is only the voltage value Va(X). In other words, the number (quantity) of the driving waveform data to be used is 1 (one). The voltage value used for generating the time division multiplex signal during the period of time from the point of time 2 μs to the point of time 3 μs included in the one cycle is the voltage values Va(X) and Vb(X). In other words, the number (quantity) of the driving waveform data to be used is 2 (two). The voltage value used for generating the time division multiplex signal during the period of time from the point of time 4 μs to the point of time 5 μs included in the one cycle is the voltage values Va(X), Vb(X) and Vd(X). In other words, the number (quantity) of the driving waveform data to be used is 3 (three).

The selector circuit 60 outputs the respective signals generated to the multiplex signal outputting circuit 61; and the multiplex signal outputting circuit 61 outputs the time division multiplex signal to the digital-analog convertor 52 (see the middle view of FIG. 6). As depicted in FIG. 3, the time division multiplex signal is amplified by the amplifier 53, and inputted into each of the plurality of n-th switches 54(*n*).

As described above, the frequency generating circuit 58 outputs the reference frequency to the respective synchronization signal generating circuits 62*a* to 62*d*; and the comparing circuit 57 associates the time slots and the respective voltage values Va(X) to Vd(X), and outputs the time slots and the respective voltage values Va(X) to Vd(X) which are associated with each other to the respective synchronization signal generating circuits 62*a* to 62*d*.

As depicted in the lower view of FIG. 6, the synchronization signal generating circuit 62*a* refers to the time slot associated with the voltage value Va(X), and generates the synchronization signal A. The time slot associated with the voltage value Va(X) is TS1 during a period of time from the point of time 0 (zero) to the point of time 2, and the synchronization signal A is in a state of the high level during the period of time from the point of time 0 (zero) to the point of time 2. The time slot associated with the voltage value Va(X) is TS2 during a period of time from the point of time 2 to the point of time 3; the synchronization signal A is in a state of the high level during a period of time from the point of time 2 to the point of time 2.5, and is in a state of the low level during a period of time from the point of time 2.5 to the point of time 3. The time slot associated with the voltage value Va(X) is TS2 during a period of time from the point of time 3 to the point of time 4; the synchronization signal A is in a state of the high level during a period of time from the point of time 3 to the point of time 3.5, and is in a state of the low level during a period of time from the point of time 3.5 to the point of time 4. The time slot associated with the voltage value Va(X) is TS4 during a period of time from the point of time 4 to the point of time 5; the synchronization signal A is in a state of the high level during a period of time from the point of time 4 to the point of time 4+(⅓), and is in a state of the low level during a period of time from the point of time 4+(⅓) to the point of time 5.

The time slot associated with the voltage value Va(X) is TS2 during a period of time from the point of time 5 to the point of time 8; the synchronization signal A is in a state of the high level during a period of time from the point of time 5 to the point of time 5.5, and is in a state of the low level during a period of time from the point of time 5.5 to the point of time 6. The synchronization signal A is in a state of the high level during a period of time from the point of time 6 to the point of time 6.5, and is in a state of the low level during a period of time from the point of time 6.5 to the point of time 7. The synchronization signal A is in a state of the high level during a period of time from the point of time 7 to the point of time 7.5, and is in a state of the low level during a period of time from the point of time 7.5 to the point of time 8. The time slot associated with the voltage value Va(X) is TS3 during a period of time from the point of time 8 to the point of time 9; the synchronization signal A is in a state of the low level during a period of time from the point of time 8 to the point of time 8.5, and is in a state of the high level during a period of time from the point of time 8.5 to the point of time 9. The time slot associated with the voltage value Va(X) is TS3 during a period of time from the point of time 9 to the point of time 14; the synchronization signal A is in a state of the low level during a period of time from the point of time 9 to the point of time 9.5, and is in a state of the high level during a period of time from the point of time 9.5 to the point of time 10. The synchronization signal A is in a state of the low level during a period of time from the point of time 10 to the point of time 10.5, and is in a state of the high level during a period of time from the point of time 10.5 to the point of time 11. The synchronization signal A is in a state of the low level during a period of time from the point of time 11 to the point of time 11.5, and is in a state of the high level during a period of time from the point of time 11.5 to the point of time 12. The synchronization signal A is in a state of the low level during a period of time from the point of time 12 to the point of time 12.5, and is in a state of the high level during a period of time from the point of time 12.5 to the point of time 13. The synchronization signal A is in a state of the low level during a period of time from the point of time 13 to the point of time 13.5, and is in a state of the high level during a period of time from the point of time 13.5 to the point of time 14.

The time slot associated with the voltage value Va(X) is TS2 during a period of time from the point of time 14 to the point of time 18; the synchronization signal A is in a state of the high level during a period of time from the point of time 14 to the point of time 14.5 and is in a state of the low level during a period of time from the point of time 14.5 to the point of time 15. The synchronization signal A is in a state of the high level during a period of time from the point of time 15 to the point of time 15.5 and is in a state of the low level during a period of time from the point of time 15.5 to the point of time 16. The synchronization signal A is in a state of the high level during a period of time from the point of time 16 to the point of time 16.5, and is in a state of the low level during a period of time from the point of time 16.5 to the point of time 17. The synchronization signal A is in a state of the high level during a period of time from the point of time 17 to the point of time 17.5, and is in a state of the low level during a period of time from the point of time 17.5 to the point of time 18. The time slot associated with the voltage value Va(X) is TS1 during a period of time from the point of time 18 to the point of time 20; the synchronization signal A is in a state of the high level during the period of time from the point of time 18 to the point of time 20. Namely, the driving waveform signal is separated from the time division multiplex signal based on the first sampling frequency, the second sampling frequency or the third sampling frequency corresponding to the respective periods of time. Each of during the period of time from the point of time 0 to the point of time 2.5, during the period of time from the point of time 13.5 to the point of time 14.5, and during the period of time from the point of time 18 to the point of time 20, the synchronization signal A is continuously in the state of the high level.

As depicted in the upper view of FIG. 7, the synchronization signal generating circuit 62*b* refers to the time slot associated with the voltage value Vb(X), and generates the synchronization signal B. The time slot associated with the voltage value Vb(X) is TS1 during a period of time from the point of time 0 (zero) to the point of time 2, and the synchronization signal B is in a state of the high level during the period of time from the point of time 0 (zero) to the point of time 2. The time slot associated with the voltage value Vb(X) is TS3 during a period of time from the point of time 2 to the point of time 4; the synchronization signal B is in a state of the low level during a period of time from the point of time 2 to the point of time 2.5, and is in a state of the high level during a period of time from the point of time 2.5 to the point of time 3. The synchronization signal B is in a state of the low level during a period of time from the point of time 3 to the point of time 3.5, and is in a state of the high level during a period of time from the point of time 3.5 to the point of time 4. The time slot associated with the voltage value Vb(X) is TS5 during a period of time from the point of time 4 to the point of time 5; the synchronization signal B is in a state of the low level each of during a period of time from the point of time 4 to the point of time 4+(⅓) and during a period of time from the point of time 4+(⅔) to the point of time 5; and the synchronization signal B is in a state of the high level during a period of time from the point of time 4+(⅓) to the point of time 4+(⅔).

The time slot associated with the voltage value Vb(X) is TS2 during a period of time from the point of time 5 to the point of time 15; the synchronization signal B is in a state of the high level during a period of time from the point of time 5 to the point of time 5.5, and is in a state of the low level during a period of time from the point of time 5.5 to the point of time 6. The synchronization signal B is in a state of the high level during a period of time from the point of time 6 to the point of time 6.5, and is in a state of the low level during a period of time from the point of time 6.5 to the point of time 7. The synchronization signal B is in a state of the high level during a period of time from the point of time 7 to the point of time 7.5, and is in a state of the low level during a period of time from the point of time 7.5 to the point of time 8. The synchronization signal B is in a state of the high level during a period of time from the point of time 8 to the point of time 8.5, and is in a state of the low level during a period of time from the point of time 8.5 to the point of time 9. The synchronization signal B is in a state of the high level during a period of time from the point of time 9 to the point of time 9.5, and is in a state of the low level during a period of time from the point of time 9.5 to the point of time 10. The synchronization signal B is in a state of the high level during a period of time from the point of time 10 to the point of time 10.5, and is in a state of the low level during a period of time from the point of time 10.5 to the point of time 11. The synchronization signal B is in a state of the high level during a period of time from the point of time 11 to the point of time 11.5, and is in a state of the low level during a period of time from the point of time 11.5 to the point of time 12. The synchronization signal B is in a state of the high level during a period of time from the point of time 12 to the point of time 12.5, and is in a state of the low level during a period of time from the point of time 12.5 to the point of time 13. The synchronization signal B is in a state of the high level during a period of time from the point of time 13 to the point of time 13.5, and is in a state of the low level during a period of time from the point of time 13.5 to the point of time 14. The synchronization signal B is in a state of the high level during a period of time from the point of time 14 to the point of time 14.5, and is in a state of the low level during a period of time from the point of time 14.5 to the point of time 15.

The time slot associated with the voltage value Vb(X) is TS3 during a period of time from the point of time 15 to the point of time 18; the synchronization signal B is in a state of the low level during a period of time from the point of time 15 to the point of time 15.5, and is in a state of the high level during a period of time from the point of time 15.5 to the point of time 16. The synchronization signal B is in a state of the low level during a period of time from the point of time 16 to the point of time 16.5, and is in a state of the high level during a period of time from the point of time 16.5 to the point of time 17. The synchronization signal B is in a state of the low level during a period of time from the point of time 17 to the point of time 17.5, and is in a state of the high level during a period of time from the point of time 17.5 to the point of time 18. The time slot associated with the voltage value Vb(X) is TS1 during a period of time from the point of time 18 to the point of time 20; and the synchronization signal B is in a state of the high level during the period of time from the point of time 18 to the point of time 20. Namely, the driving waveform signal is separated from the time division multiplex signal based on the first sampling frequency, the second sampling frequency, the third sampling frequency or the fourth sampling frequency corresponding to the respective periods of time. Each of during the period of time from the point of time 0 to the point of time 2 and during the period of time from the point of time 17.5 to the point of time 20, the synchronization signal B is continuously in the state of the high level.

As depicted in the middle view of FIG. 7, the synchronization signal generating circuit 62*c* refers to the time slot associated with the voltage value Vc(X), and generates the synchronization signal C. The time slot associated with the voltage value Vc(X) is TS1 during a period of time from the point of time 0 (zero) to the point of time 2, and the synchronization signal C is in a state of the high level during the period of time from the point of time 0 (zero) to the point of time 2. The time slot associated with the voltage value Vc(X) is TS2 during a period of time from the point of time 2 to the point of time 4; the synchronization signal C is in a state of the high level during a period of time from the point of time 2 to the point of time 2.5, and is in a state of the low level during a period of time from the point of time 2.5 to the point of time 3. The synchronization signal C is in a state of the high level during a period of time from the point of time 3 to the point of time 3.5, and is in a state of the low level during a period of time from the point of time 3.5 to the point of time 4. The time slot associated with the voltage value Vc(X) is TS4 during a period of time from the point of time 4 to the point of time 5; the synchronization signal C is in a state of the high level during a period of time from the point of time 4 to the point of time 4+(⅓), and is in a state of the low level during a period of time from the point of time 4+(⅓) to the point of time 5.

The time slot associated with the voltage value Vc(X) is TS2 during a period of time from the point of time 5 to the point of time 8; the synchronization signal C is in a state of the high level during a period of time from the point of time 5 to the point of time 5.5, and is in a state of the low level during a period of time from the point of time 5.5 to the point of time 6. The synchronization signal C is in a state of the high level during a period of time from the point of time 6 to the point of time 6.5, and is in a state of the low level during a period of time from the point of time 6.5 to the point of time 7. The synchronization signal C is in a state of the high level during a period of time from the point of time 7 to the point of time 7.5, and is in a state of the low level during a period of time from the point of time 7.5 to the point of time 8.

The time slot associated with the voltage value Vc(X) is TS3 during a period of time from the point of time 8 to the point of time 18; the synchronization signal C is in a state of the low level during a period of time from the point of time 8 to the point of time 8.5, and is in a state of the high level during a period of time from the point of time 8.5 to the point of time 9. The synchronization signal C is in a state of the low level during a period of time from the point of time 9 to the point of time 9.5, and is in a state of the high level during a period of time from the point of time 9.5 to the point of time 10. The synchronization signal C is in a state of the low level during a period of time from the point of time 10 to the point of time 10.5, and is in a state of the high level during a period of time from the point of time 10.5 to the point of time 11. The synchronization signal C is in a state of the low level during a period of time from the point of time 11 to the point of time 11.5, and is in a state of the high level during a period of time from the point of time 11.5 to the point of time 12. The synchronization signal C is in a state of the low level during a period of time from the point of time 12 to the point of time 12.5, and is in a state of the high level during a period of time from the point of time 12.5 to the point of time 13. The synchronization signal C is in a state of the low level during a period of time from the point of time 13 to the point of time 13.5, and is in a state of the high level during a period of time from the point of time 13.5 to the point of time 14. The synchronization signal C is in a state of the low level during a period of time from the point of time 14 to the point of time 14.5, and is in a state of the high level during a period of time from the point of time 14.5 to the point of time 15. The synchronization signal C is in a state of the low level during a period of time from the point of time 15 to the point of time 15.5, and is in a state of the high level during a period of time from the point of time 15.5 to the point of time 16. The synchronization signal C is in a state of the low level during a period of time from the point of time 16 to the point of time 16.5, and is in a state of the high level during a period of time from the point of time 16.5 to the point of time 17. The synchronization signal C is in a state of the low level during a period of time from the point of time 17 to the point of time 17.5, and is in a state of the high level during a period of time from the point of time 17.5 to the point of time 18.

The time slot associated with the voltage value Vc(X) is TS1 during a period of time from the point of time 18 to the point of time 20; the synchronization signal C is in a state of the high level during the period of time from the point of time 18 to the point of time 20. Namely, the driving waveform signal is separated from the time division multiplex signal based on the first sampling frequency, the second sampling frequency or the third sampling frequency corresponding to the respective periods of time. Each of during the period of time from the point of time 0 to the point of time 2.5 and during the period of time from the point of time 17.5 to the point of time 20, the synchronization signal C is continuously in the state of the high level.

As depicted in the lower view of FIG. 7, the synchronization signal generating circuit 62*d* refers to the time slot associated with the voltage value Vd(X), and generates the synchronization signal D. The time slot associated with the voltage value Vd(X) is TS1 during a period of time from the point of time 0 (zero) to the point of time 2, and the synchronization signal D is in a state of the high level during the period of time from the point of time 0 (zero) to the point of time 2. The time slot associated with the voltage value Vd(X) is TS3 during a period of time from the point of time 2 to the point of time 4; the synchronization signal D is in a state of the low level during a period of time from the point of time 2 to the point of time 2.5, and is in a state of the high level during a period of time from the point of time 2.5 to the point of time 3. The synchronization signal D is in a state of the low level during a period of time from the point of time 3 to the point of time 3.5, and is in a state of the high level during a period of time from the point of time 3.5 to the point of time 4. The time slot associated with the voltage value Vd(X) is TS6 during a period of time from the point of time 4 to the point of time 5; the synchronization signal D is in a state of the low level during a period of time from the point of time 4 to the point of time 4+(⅔), and is in a state of the high level during a period of time from the point of time 4+(⅔) to the point of time 5. The time slot associated with the voltage value Vd(X) is TS3 during a period of time from the point of time 5 to the point of time 9; the synchronization signal D is in a state of the low level during a period of time from the point of time 5 to the point of time 5.5, and is in a state of the high level during a period of time from the point of time 5.5 to the point of time 6. The synchronization signal D is in a state of the low level during a period of time from the point of time 6 to the point of time 6.5, and is in a state of the high level during a period of time from the point of time 6.5 to the point of time 7. The synchronization signal D is in a state of the low level during a period of time from the point of time 7.5 to the point of time 8, and is in a state of the high level during a period of time from the point of time 7.5 to the point of time 8. The synchronization signal D is in a state of the low level during a period of time from the point of time 8 to the point of time 8.5, and is in a state of the high level during a period of time from the point of time 8.5 to the point of time 9.

The time slot associated with the voltage value Vd(X) is TS2 during a period of time from the point of time 9 to the point of time 15; the synchronization signal D is in a state of the high level during a period of time from the point of time 9 to the point of time 9.5, and is in a state of the low level during a period of time from the point of time 9.5 to the point of time 10. The synchronization signal D is in a state of the high level during a period of time from the point of time 10 to the point of time 10.5, and is in a state of the low level during a period of time from the point of time 10.5 to the point of time 11. The synchronization signal D is in a state of the high level during a period of time from the point of time 11 to the point of time 11.5, and is in a state of the low level during a period of time from the point of time 11.5 to the point of time 12. The synchronization signal D is in a state of the high level during a period of time from the point of time 12 to the point of time 12.5, and is in a state of the low level during a period of time from the point of time 12.5 to the point of time 13. The synchronization signal D is in a state of the high level during a period of time from the point of time 13 to the point of time 13.5, and is in a state of the low level during a period of time from the point of time 13.5 to the point of time 14. The synchronization signal D is in a state of the high level during a period of time from the point of time 14 to the point of time 14.5, and is in a state of the low level during a period of time from the point of time 14.5 to the point of time 15.

The time slot associated with the voltage value Vd(X) is TS3 during a period of time from the point of time 15 to the point of time 18; the synchronization signal D is in a state of the low level during a period of time from the point of time 15 to the point of time 15.5, and is in a state of the high level during a period of time from the point of time 15.5 to the point of time 16. The synchronization signal D is in a state of the low level during a period of time from the point of time 16 to the point of time 16.5, and is in a state of the high level during a period of time from the point of time 16.5 to the point of time 17. The synchronization signal D is in a state of the low level during a period of time from the point of time 17 to the point of time 17.5, and is in a state of the high level during a period of time from the point of time 17.5 to the point of time 18. The time slot associated with the voltage value Vd(X) is TS1 during a period of time from the point of time 18 to the point of time 20; the synchronization signal D is in a state of the high level during the period of time from the point of time 18 to the point of time 20. Namely, the driving waveform signal is separated from the time division multiplex signal based on the first sampling frequency, the second sampling frequency or the third sampling frequency corresponding to the respective periods of time. Each of during the period of time from the point of time 0 to the point of time 2, during the period of time from the point of time 8.5 to the point of time 9.5, and during the period of time from the point of time 17.5 to the point of time 20, the synchronization signal D is continuously in the state of the high level.

The synchronization signal generating circuits 62*a* to 62*d* output, respectively, the synchronization signals A to D to the switch group 54 (an example of "separator"). As depicted in FIG. 3, the control circuit 51 outputs a switch controlling signal S1 for controlling the opening and closing of the plurality of n-th switches 54(*n*). The switch controlling signal S1 includes first selection information indicating a selection of any one of the plurality of n-th switches 54(*n*), and second selection information indicating a selection of any one of the four synchronization signals A to D. The first selection information and the second selection information are associated with each other.

The switch group 54 opens or closes the selected n-th switch 54(*n*) at an opening and closing timing indicated by the selected one of the synchronization signals A to D. As descried before, since the time division multiplex signal is inputted to each of the plurality of n-th switches 54(*n*), the n-th switch 54(*n*) is opened or closed to thereby input the driving waveform corresponding to one of the driving waveform data Da to Dd to the actuator 88.

Figure 9:
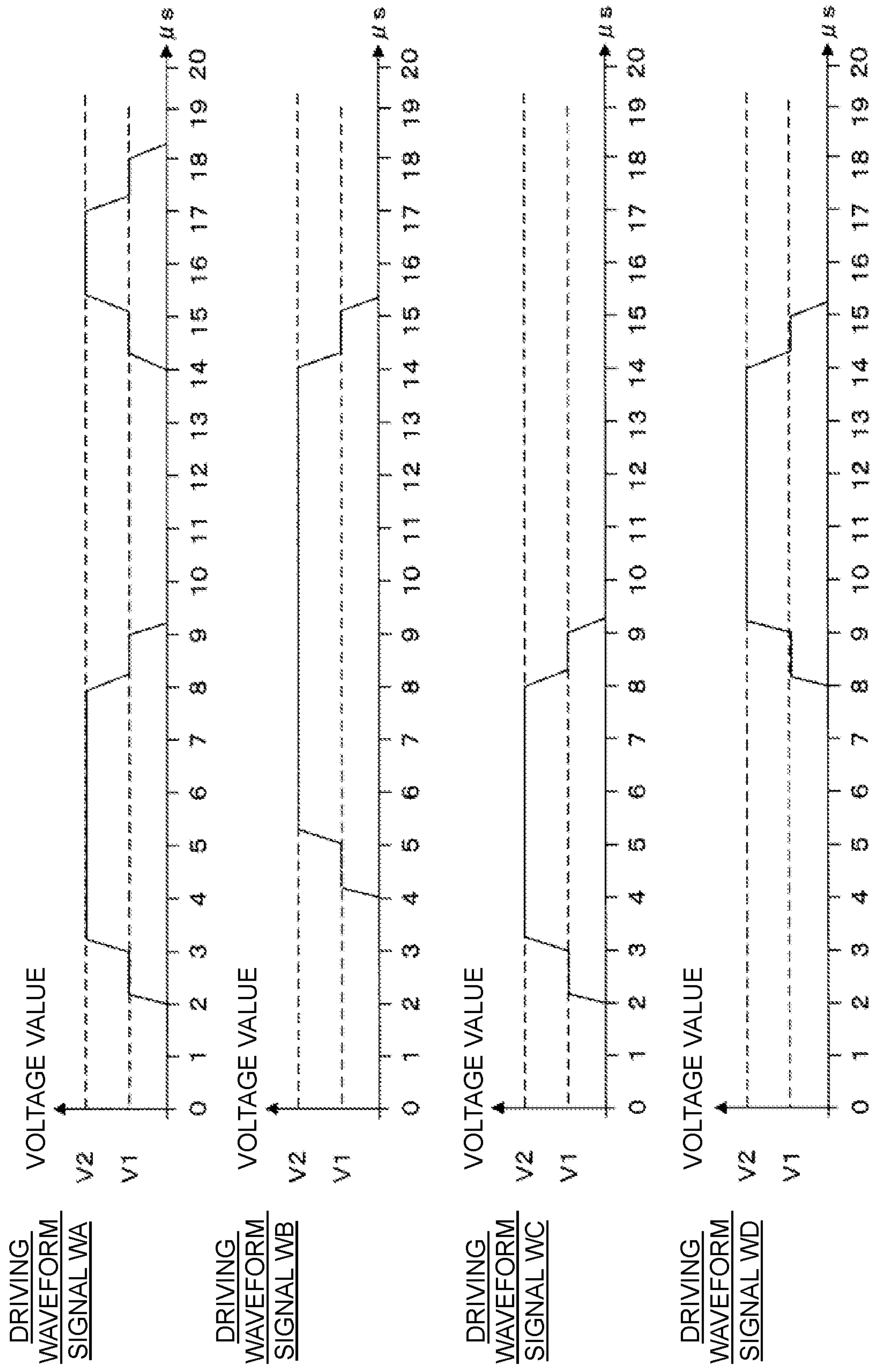
FIG. 9 is a schematic view of driving waveform signals inputted to an actuator by opening and closing of a n-th switch.

FIG. 9 is a schematic view of driving waveform signals inputted to the actuator 88 by the opening and closing of the n-th switch 54(*n*). In a case that the synchronization signal A is selected, the switch group 54 closes the n-th switch 54(*n*) in a case that the pulse of the synchronization signal A is of the high level, and opens the n-th switch 54(*n*) in a case that the pulse of the synchronization signal A is of the low level. The electric charge applied to the individual electrode 85 in a case that the n-th switch 54(*n*) is closed is maintained by the first capacitor 89*a* and the second capacitor 89*b*. Namely, a driving waveform signal WA is separated from the time division multiplex signal. As depicted in FIG. 9, the driving waveform signal WA is inputted to the actuator 88, and the actuator 88 is thereby driven.

In a case that the synchronization signal B is selected, the switch group 54 closes the n-th switch 54(*n*) in a case that the pulse of the synchronization signal B is of the high level, and opens the n-th switch 54(*n*) in a case that the pulse of the synchronization signal B is of the low level. The electric charge applied to the individual electrode 85 in the case that the n-th switch 54(*n*) is closed is maintained by the first capacitor 89*a* and the second capacitor 89*b*. Namely, a driving waveform signal WB is separated from the time division multiplex signal. As depicted in FIG. 9, the driving waveform signal WB is inputted to the actuator 88, and the actuator 88 is thereby driven.

In a case that the synchronization signal C is selected, the switch group 54 closes the n-th switch 54(*n*) in a case that the pulse of the synchronization signal C is of the high level, and opens the n-th switch 54(*n*) in a case that the pulse of the synchronization signal C is of the low level. The electric charge applied to the individual electrode 85 in a case that the n-th switch 54(*n*) is closed is maintained by the first capacitor 89*a* and the second capacitor 89*b*. Namely, a driving waveform signal WC is separated from the time division multiplex signal. As depicted in FIG. 9, the driving waveform signal WC is inputted to the actuator 88, and the actuator 88 is thereby driven.

In a case that the synchronization signal D is selected, the switch group 54 closes the n-th switch 54(*n*) in a case that the pulse of the synchronization signal D is of the high level, and opens the n-th switch 54(*n*) in a case that the pulse of the synchronization signal D is of the low level. The electric charge applied to the individual electrode 85 in a case that the n-th switch 54(*n*) is closed is maintained by the first capacitor 89*a* and the second capacitor 89*b*. Namely, a driving waveform signal WD is separated from the time division multiplex signal. As depicted in FIG. 9, the driving waveform signal WD is inputted to the actuator 88, and the actuator 88 is thereby driven.

In a case that the actuator 88 is driven by the driving waveform signal WA, the size of the ink discharged from the nozzle 80 is "medium". In a case that the actuator 88 is driven by the driving waveform signal WB, the size of the ink discharged from the nozzle 80 is "large". In each of a case that the actuator 88 is driven by the driving waveform signal WC and a case that the actuator 88 is driven by the driving waveform signal WD, the size of the ink discharged from the nozzle 80 is "small". The timing of discharging the ink is different between the driving waveform WC and the driving waveform WD.

In the first embodiment, the comparing circuit 57 compares the voltage values inputted, respectively, from the voltage table $T_{va}$ to $T_{vd}$, in a case that any one of the comparison timing signals Sa to Sd is inputted from the counters 56*a* to 56*d* to the comparing circuit 57. However, the timing at which the voltage values are compared is not limited to or restricted by this. For example, it is allowable that the frequency generating circuit 58 outputs the comparison timing signal having the reference frequency (24 MHz) to the comparing circuit 57 and that the comparing circuit 57 compares the voltage values inputted from the respective voltage table $T_{va}$ to $T_{vd}$, at each of points of time at which one cycle of the reference frequency elapses. For example, as depicted in the upper view of FIG. 6, at the point of time 4, the voltage value Va(X) and the voltage value Vc(X) are both V2, the voltage value Vb(X) is V1, and the voltage value Vd(X) is 0 (zero). In this situation, the comparing circuit 57 associates TS4 with the voltage values Va(X) and Vc(X); the comparing circuit 57 outputs TS4 and the voltage values Va(X) and Vc(X) which are associated with each other to the switching circuit 59 and the respective synchronization signal generating circuits 62*a* to 62*d*; the comparing circuit 57 associates TS5 with the voltage value Vb(X); and the comparing circuit 57 outputs TS5 and the voltage value Vb(X) which are associated with each other to the switching circuit 59 and the respective synchronization signal generating circuits 62*a* to 62*d*. The comparing circuit 57 associates TS6 with the voltage value Vd(X), and outputs TS6 and the voltage value Vd(X) which are associated with each other to the switching circuit 59 and the respective synchronization signal generating circuits 62*a* to 62*d*. At each of the points of time at which one cycle of the reference frequency elapses, the switching circuit 59 selects one voltage value, for example, the voltage value Va(X), from the two voltage values Va(X) and Vc(X). At each of the points of time at which one cycle of the reference frequency elapses, the switching circuit 59 selects the voltage values Vb(X) and Vd(X). In this case, it is possible to reduce a configuration for outputting the comparison timing signals Sa to Sd from the counters 56*a* to 56*d*, respectively, to the comparing circuit 57.

In the first embodiment, there are the three voltage values which are 0, V1 and V2; the four driving waveform data Da to Dd do not have or indicate mutually different voltages at a time. However, for example, in a case that there is the voltage value V3 which is greater than the voltage value V2, the voltage values, respectively, of the four driving waveform data Da to Dd may be 0, V1, V2 and V3, respectively, at a time, and may have or indicate mutually different voltage values. In such a case, the time slots which are applied are TS7 to TS10 (see FIG. 8). In this situation, the number of the driving waveform data to be used for generating the time division multiplex signal during a period of time from the point of time k to the point of time k+1 included in one cycle of the time division multiplex signal is 4 (four).

In the printing apparatus according to the first embodiment, the time division multiplex signal is generated from the plurality of pieces of the driving waveform data Da to Dd indicating, respectively, the mutually different driving waveforms. Each, of the driving waveform signals WA to WD, which corresponds to one of the mutually different driving waveforms is separated from the generated time division multiplex signal. The actuator 88 is driven by any one, of the driving waveform signal WA and WD, separated from the time division multiplex signal. By separating one of the driving waveform signals WA to WD, it is possible to adjust the shape of the driving waveform to be applied to the actuator 88. Further, the one cycle for printing one pixel includes only a cycle of any one of the driving waveforms, and does not include the cycle(s) of another or any other driving waveform(s). Accordingly, it is possible to reduce the waiting time of the nozzle 80.

In a case that the driving waveform data Da to Dd include such data wherein the voltage values have a same voltage value at a time, for example in a case that the voltage values of the driving waveform data Da to Dc are V2 during a period of time from the point of time 5 μs to 6 μs, as indicated by the middle view of FIG. 6, one signal of which voltage value is V2 is generated during the period of time from the point of time 5 μs to 6 μs. Namely, the time division multiplex signals corresponding, respectively, to the driving waveform data Da to Dc during the period of time from the point of time 5 μs to 6 μs are collated as one time division multiplex signal. Further, as indicated in the lower view of FIG. 6 and in FIG. 7, during the period of time from the point of time 5 μs to 6 μs, the pulse waves of the respective synchronization signals A to C are made to have a same shape corresponding to the one time division multiplex signal which is collated as described above. Accordingly, it is possible to make the switching frequency in the switch group 54 to be small and to suppress the generation of any noise and the increase in the power consumption, as compared with a case wherein the pulse waves of the respective synchronization signals A to C are mutually different.

In the above embodiment, in a case that a voltage value indicated by one driving waveform and a voltage value indicated by another driving waveform are same as each other in a certain period of time, the time division multiplex signal during the certain period of time includes a signal collectively corresponds to one driving waveform and another driving waveform. Thus, regarding the certain period of time, a width (temporal width) of the signal is large. Accordingly, it is possible to separate one driving waveform and another driving waveform from the time division multiplex signal precisely even in a case that any error to some extent occurs in the synchronization signal to be used for the separation.

SECOND EMBODIMENT

Figure 10:
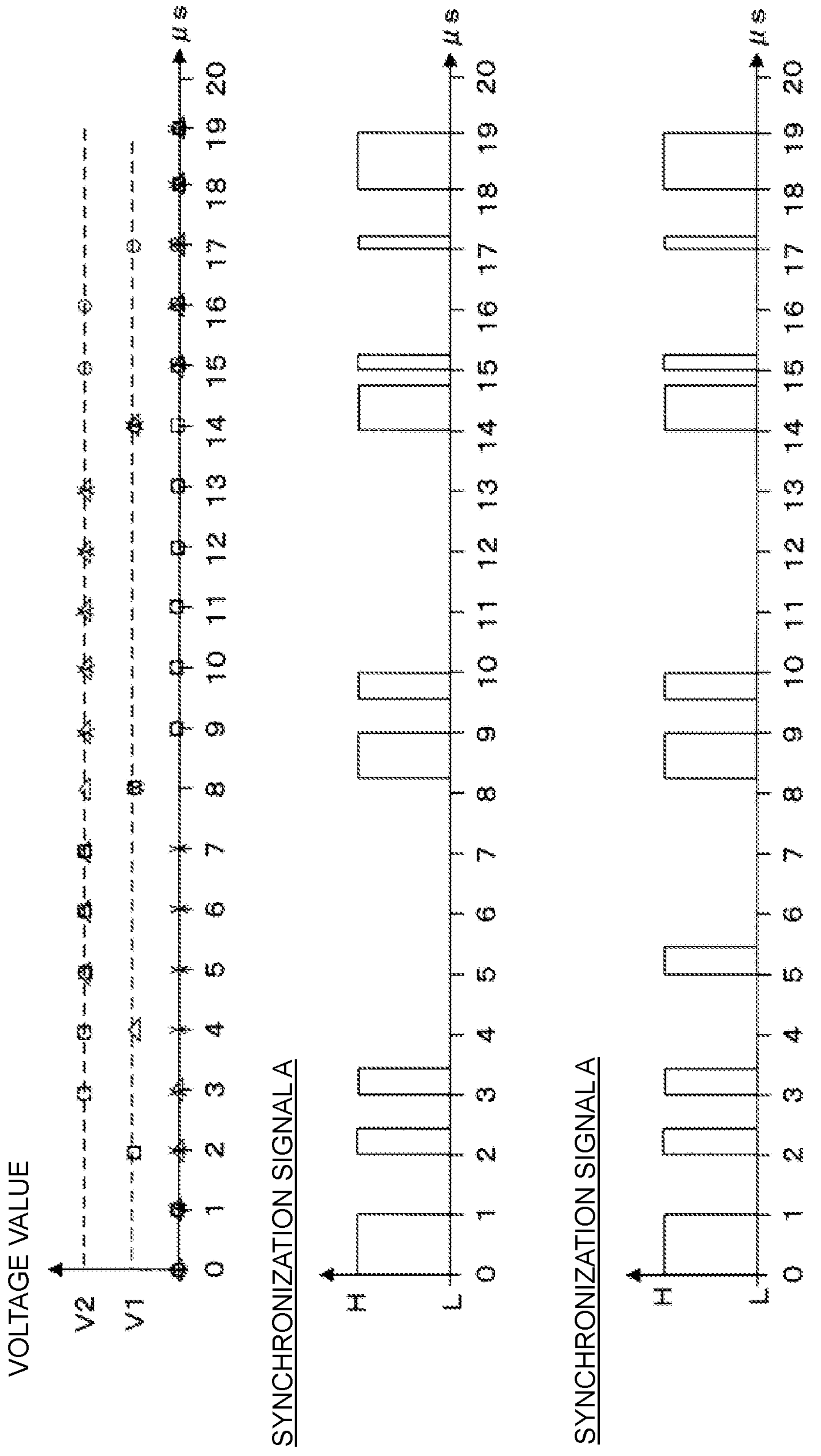
FIG. 10 is a graph of driving waveform data of one cycle which is plotted in time series and graphs indicating synchronization signals.

A second embodiment of the present disclosure will be explained below on the basis of the drawings which depict a printing apparatus 1 according to the second embodiment. Constitutive components according to the second embodiment, which are the same as or equivalent to the constitutive components according to the first embodiment, are designated by the same reference numerals as those of the first embodiment, any detailed explanation of which will be omitted. FIG. 10 includes a graph of driving waveform data Da to Dd of one cycle plotted in time series and graphs indicating a synchronization signal A. The upper view of the FIG. 10 is the graph of the driving waveform data Da to Dd which is plotted in time series. The middle view and the lower view of FIG. 10 each indicates the synchronization signal A which is generated by the synchronization signal generating circuit 62*a*.

As depicted by the upper view of FIG. 10, a voltage value, of the voltage table $T_{va}$, which is indicated by a circle is V2 during a period of time from a point of time 3 to a point of time 7, and the voltage value is not changed. The voltage value, of the voltage table $T_{va}$, which is indicated by a circle, is V2 during a period of time from a point of time 15 to a point of time 16, and the voltage value is not changed. Since electric charge applied to the individual electrode 85 in a case that the n-th switch 54(*n*) is closed is maintained by the first capacitor 89*a* and the second capacitor 89*b*, it is not necessary to apply the voltage to the individual electrode 85 while the same voltage value is continued. Thus, the CPU 51*a* outputs, with respect to the synchronization signal generating circuit 62*a*, a signal for maintaining the low level during a period of time from the point of time 3 to point of time 4 and during a period of time from the point of time 15 to the point of time 16. As depicted in the middle view of FIG. 10, during the period of time from the point of time 3 to the point of time 4, the synchronization signal generating circuit 62*a* makes the synchronization signal A to be of the high level and then makes the synchronization signal A to be of the low level until the point of time 8; and during the period of time from the point of time 15 to the point of time 16, the synchronization signal generating circuit 62*a* makes the synchronization signal A to be of the high level and then makes the synchronization signal A to be of the low level until the point of time 17. Thus, it is possible to further lower the switching frequency in the switch group 54.

In the middle view of FIG. 10, the synchronization signal generating circuit 62*a* makes the synchronization signal A to be ON (high level) during the period of time from the point of time 3 to the point of time 4, and then makes the synchronization signal A to be OFF (low level) until the point of time 8. Here, it is allowable that the synchronization signal generating circuit 62*a* makes the synchronization signal A to be ON during the period of time from the point of time 4 to the point of time 8. For example, as depicted in the lower view of FIG. 10, it is allowable that during the period of time from the point of time 5 to the point of time 6, the synchronization signal generating circuit 62*a* makes the synchronization signal A to be ON. In such a case, it is possible to avoid such a situation that the first capacitor 89*a* and the second capacitor 89*b* discharge the electricity and that the voltage is lowered. Note that it is also allowable to provide a similar configuration regarding the voltage values of the voltage table $T_{vb}$ to $T_{vd}$ and the synchronization signals B to D.

THIRD EMBODIMENT

A third embodiment of the present disclosure will be explained below on the basis of the drawings which depict a printing apparatus 1 according to the third embodiment. Constitutive components according to the third embodiment, which are the same as or equivalent to the constitutive components according to the first or second embodiment, are designated by the same reference numerals as those of the first or second embodiment, any detailed explanation of which will be omitted. A variety of kinds of a printing method are inputted from the external device 100 to the controller 50. The printing method includes, for example, low resolution printing, high resolution printing, overlapping printing, high speed printing and low speed printing. The overlapping printing is a printing method wherein first printing is performed with respect to a print medium, and then second printing is performed to be overlapped on a part of the print medium. the first printing having been performed on the part of the print medium. The controller 50 (specifically, for example, CPU 51*a* or the switching circuit 59. An example of "selector".) selects a predetermined number of driving waveform data among the four driving waveform data Da to Dd, depending on the printing method inputted to the controller 50, and executes the printing based on the driving waveform data of the selected predetermined number.

Figure 11:
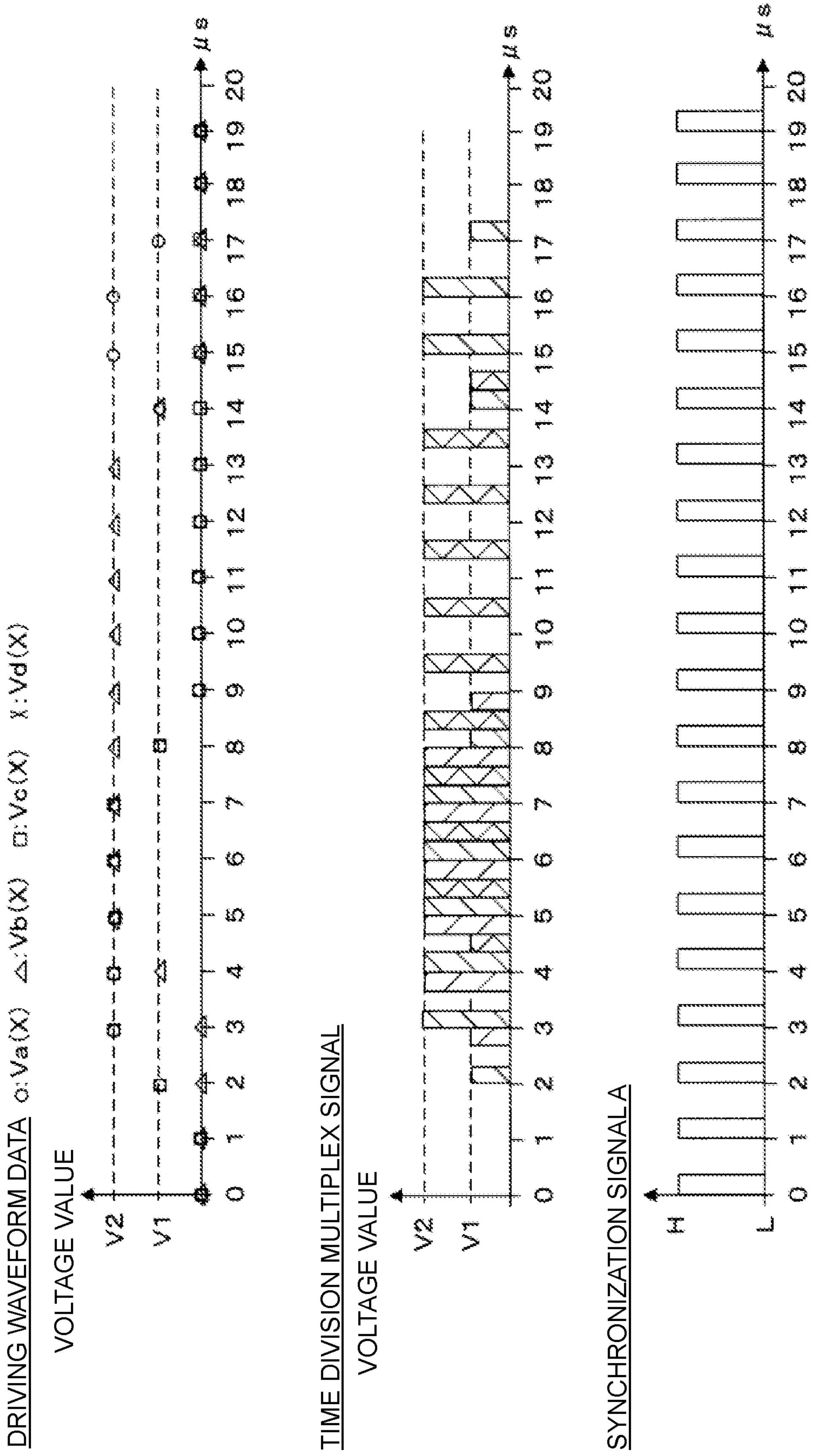
FIG. 11 is a graph of driving waveform data of one cycle which is plotted in time series, a graph indicating a time division multiplex signal, and a graph indicating a synchronization signal in a case of executing a low resolution printing.
Figure 12:
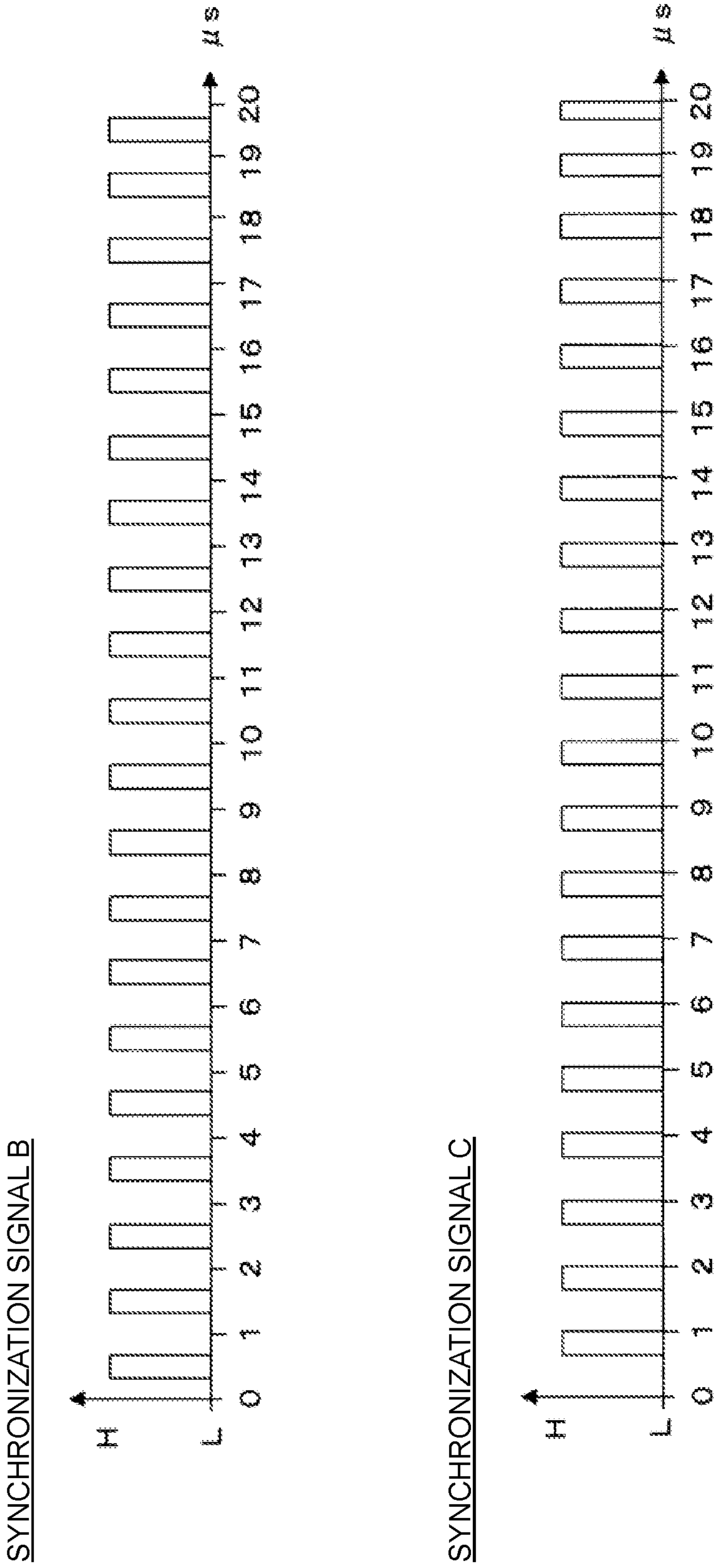
FIG. 12 is graphs indicating synchronization signals.

A case of executing the low resolution printing will be explained. FIG. 11 is a graph of driving waveform data Da to Dc of one cycle plotted in time series, a graph indicating a time division multiplex signal, and a graph indicating a synchronization signal A in the case of executing the low resolution printing; FIG. 12 including graphs indicating synchronization signals B and C in the case of executing the low resolution printing. As depicted in the upper view of FIG. 11, the three driving waveform data Da to Dc are used. The voltage values Va(X) to Vc(X) are inputted, respectively, from the voltage table $T_{va}$ to $T_{vc}$, to the selector circuit 60, and the times ta(X) to tc(X) are inputted, respectively, from the time tables $T_{ta}$ to $T_{tc}$, to the selector circuit 60. As described above, the voltage values Va(X) to Vc(X) and the times ta(X) to tc(X) are associated with each other via the address X. Note that in a case of executing the high resolution printing, four driving waveform data Da to Dd are used. Since the number of kinds of ink droplet size in the low resolution printing can be made smaller than the number of kinds of ink droplet size in the high resolution printing, it is possible to reduce the number of the driving waveform data to be used. The reference frequency is inputted from the frequency generating circuit 58 to the selector circuit 60. Note that it is allowable to use one piece or two pieces of the driving waveform data in the low resolution printing.

In a case that a print job indicating the low resolution printing is inputted, the CPU 51*a* associates TS4 and the voltage value Va(X) with each other and outputs TS4 and the voltage value Va(X) which are associated with each other to the selector circuit 60; the CPU Ma associates TS5 and the voltage value Vb(X) with each other and outputs TS5 and the voltage value Vb(X) which are associated with each other to the selector circuit 60; and the CPU Ma associates TS6 and the voltage value Vc(X) with each other and outputs TS6 and the voltage value Vc(X) which are associated with each other to the selector circuit 60. As depicted in the middle view of FIG. 11, the selector circuit 60 refers to the voltage value Va(X) and TS4 inputted from the CPU 51*a*, selects the voltage value Va(X) from the three voltage values Va(X) to Vc(X) inputted from the voltage tables $T_{va}$ to $T_{vc}$, respectively, selects the time ta(X) from the three times ta(X) to tc(X) inputted from the time tables $T_{ta}$ to $T_{tc}$, respectively, and generates, at every 1 μs, and based on TS4 and the reference frequency, a signal of which voltage value becomes to be the voltage value Va(X) during a period of time from the point of time k μs to the point of time k+(⅓) μs (in this embodiment, k=1, 2, . . . , 19).

As depicted in the middle view of FIG. 11, the selector circuit 60 refers to the voltage value Vb(X) and TS5 inputted from the CPU 51*a*, selects the voltage value Vb(X) from the three voltage values Va(X) to Vc(X) inputted from the voltage tables $T_{va}$ to $T_{vc}$, respectively, selects the time tb(X) from the three times ta(X) to tc(X) inputted from the time tables $T_{ta}$ to $T_{tc}$, respectively, and generates, at every 1 μs, and based on TS5 and the reference frequency, a signal of which voltage value becomes to be the voltage value Vb(X) during a period of time from the point of time k+(⅓) μs to the point of time k+(⅔) μs.

As depicted in the middle view of FIG. 11, the selector circuit 60 refers to the voltage value Vc(X) and TS6 inputted from the CPU 51*a*, selects the voltage value Vc(X) from the three voltage values Va(X) to Vc(X) inputted from the voltage tables $T_{va}$ to $T_{vc}$, respectively, selects the time tc(X) from the three times ta(X) to tc(X) inputted from the time tables $T_{ta}$ to $T_{tc}$, respectively, and generates, at every 1 μs, and based on TS6 and the reference frequency, a signal of which voltage value becomes to be Vc(X) during a period of time from the point of time k+(⅔) μs to the point of time k+1 μs. Namely, during one cycle of the time division multiplex signal, the number of the driving waveform data to be used for generating the time division multiplex signal is 3 (three), and the number is not changed. The selector circuit 60 outputs the respective signals which are generated, namely, the time division multiplex signal, to the multiplex signal outputting circuit 61.

The CPU 51*a* outputs TS4 to the synchronization signal generating circuit 62*a*, outputs TS5 to the synchronization signal generating circuit 62*b*, and outputs TS6 to the synchronization signal generating circuit 62*c*. As depicted in the lower view of FIG. 11, the synchronization signal generating circuit 62*a* generates, at every 1 μs, a signal which becomes to be of the high level during a period of time from the point of time k μs to the point of time k+(⅓) μs, thereby generating the synchronization signal A. As depicted in the upper view of FIG. 12, the synchronization signal generating circuit 62*b* generates, at every 1 μs, a signal which becomes to be of the high level during a period of time from the point of time k+(⅓) μs to the point of time k+(⅔) μs, thereby generating the synchronization signal B. As depicted in the lower view of FIG. 12, the synchronization signal generating circuit 62*c* generates, at every 1 μs, a signal which becomes to be of the high level during a period of time from the point of time k+(⅔) μs to the point of time k+1 μs, thereby generating the synchronization signal C.

In a case that the synchronization signal A is selected, the driving waveform signal WA is separated from the time division multiplex signal; the driving waveform signal WA is inputted to the actuator 88; and the actuator 88 is driven. In a case that the synchronization signal B is selected, the driving waveform signal WB is separated from the time division multiplex signal; the driving waveform signal WB is inputted to the actuator 88; and the actuator 88 is driven. In a case that the synchronization signal C is selected, the driving waveform signal WC is separated from the time division multiplex signal; the driving waveform signal WC is inputted to the actuator 88; and the actuator 88 is driven.

Figure 13:
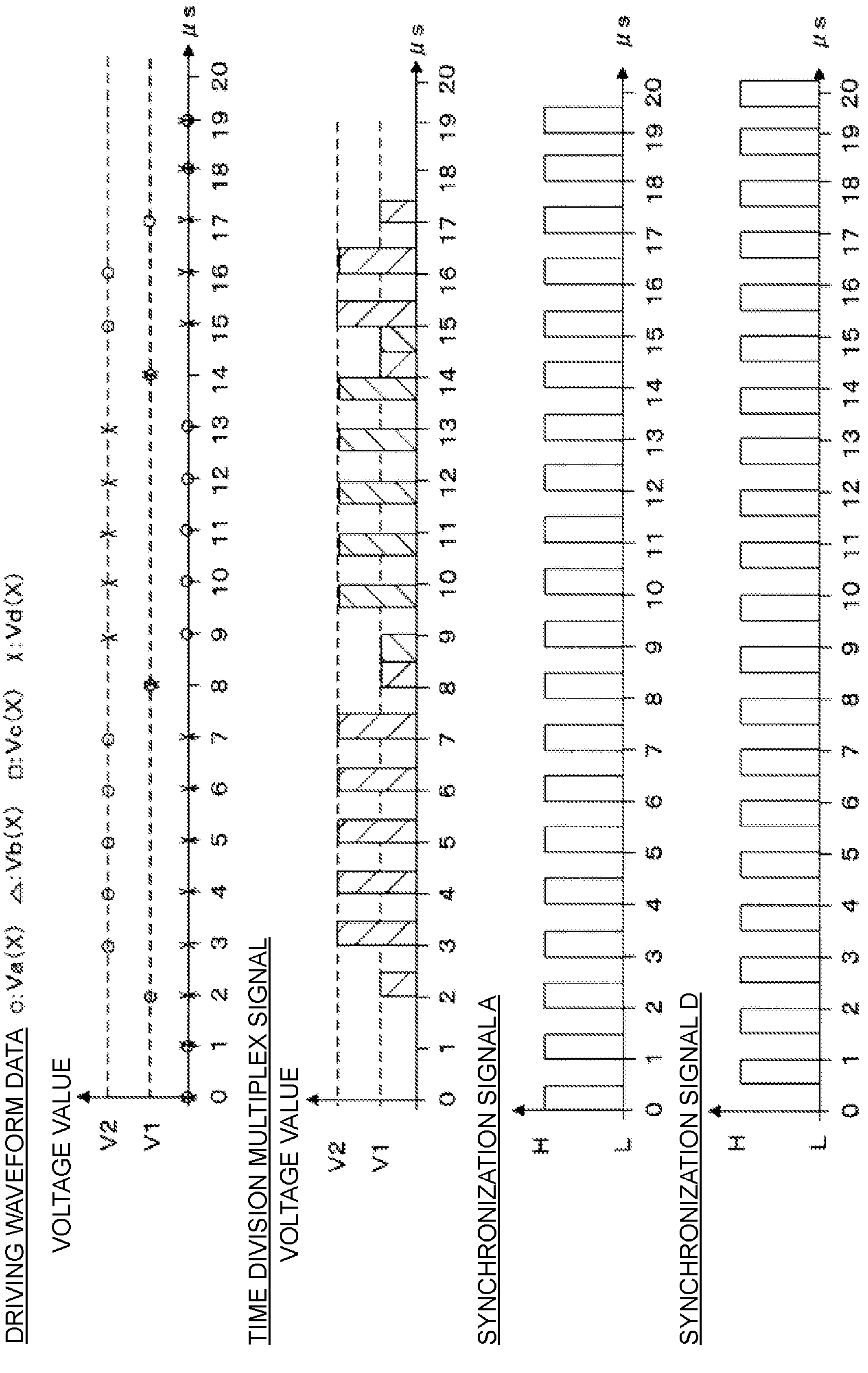
FIG. 13 is a graph of driving waveform data of one cycle which is plotted in time series, a graph indicating a time division multiplex signal, and graphs indicating synchronization signals in a case of executing a high speed printing.

A case of executing the high speed printing will be explained. FIG. 13 includes a graph of driving waveform data Da and Dd of one cycle plotted in time series, a graph indicating a time division multiplex signal, and graphs indicating synchronization signals A and D in a case of executing the high speed printing. As depicted in the uppermost view of FIG. 13, the two driving waveform data Da and Dd are used. The voltage values Va(X) and Vd(X) are inputted, respectively, from the voltage table $T_{va}$ and $T_{vd}$, to the selector circuit 60, and the times ta(X) and td(X) are inputted, respectively, from the time tables $T_{ta}$ and $T_{td}$, to the selector circuit 60. As described above, the voltage value Va(X) and the time ta(X) are associated with each other via the address X and the voltage value Vd(X) and the time td(X) are associated with each other via the address X. Note that in a case of executing the low speed printing, four driving waveform data Da to Dd are used. Since the high speed sprinting is not required to realize a high quality as compared with the low speed printing, it is possible to reduce the number of the driving waveform data to be used in the high speed printing. In other words, in a case of executing the high speed printing, the controller 50 is configured such that a number of the driving waveform data to be selected by the controller 50 for the high speed printing is smaller than a number of the driving waveform data to be selected by the controller 50 for the low speed printing. The reference frequency is inputted from the frequency generating circuit 58 to the selector circuit 60. Note that it is allowable to use one piece or three pieces of the driving waveform data in the high speed printing.

In a case that a print job indicating the high speed printing is inputted, the CPU 51*a* associates TS2 and the voltage value Va(X) with each other and outputs TS2 and the voltage value Va(X) which are associated with each other to the selector circuit 60; and the CPU 51*a* associates TS3 and the voltage value Vd(X) with each other and outputs TS3 and the voltage value Vd(X) which are associated with each other to the selector circuit 60. As depicted in the second uppermost view of FIG. 13, the selector circuit 60 refers to the voltage value Va(X) and TS2 inputted from the CPU 51*a*, selects the voltage value Va(X) from the two voltage values Va(X) and Vd(X) inputted from the voltage tables $T_{va}$ and $T_{vc}$, respectively, selects the time ta(X) from the two times ta(X) and td(X) inputted from the time tables $T_{ta}$ and $T_{td}$, respectively, and generates, at every 1 μs, and based on TS2 and the reference frequency, a signal of which voltage value becomes to be the voltage value Va(X) during a period of time from the point of time k μs to the point of time k+0.5 μs (in this embodiment, k=1, 2, . . . , 19). Namely, during one cycle of the time division multiplex signal, the number of the driving waveform data to be used for generating the time division multiplex signal is 2 (two), and the number is not changed.

As depicted in the second uppermost view of FIG. 13, the selector circuit 60 refers to the voltage value Vd(X) and TS3 inputted from the CPU 51*a*, selects the voltage value Vd(X) from the two voltage values Va(X) and Vd(X) inputted from the voltage tables $T_{va}$ and $T_{vd}$, respectively, selects the time td(X) from the two times ta(X) and td(X) inputted from the time tables $T_{ta}$ and $T_{td}$, respectively, and generates, at every 1 μs, and based on TS3 and the reference frequency, a signal of which voltage value becomes to be the voltage value Vd(X) during a period of time from the point of time k+0.5 μs to the point of time k+1 μs.

The CPU 51*a* outputs TS2 to the synchronization signal generating circuit 62*a*, and outputs TS3 to the synchronization signal generating circuit 62*d*. As depicted in the third uppermost view of FIG. 13, the synchronization signal generating circuit 62*a* generates, at every 1 μs, a signal which becomes to be of the high level during the period of time from the point of time k μs to the point of time k+0.5 μs, thereby generating the synchronization signal A. As depicted in the lowermost view of FIG. 13, the synchronization signal generating circuit 62*d* generates, at every 1 μs, a signal which becomes to be of the high level during the period of time from the point of time k+0.5 μs to the point of time k+1 μs, thereby generating the synchronization signal D.

In a case that the synchronization signal A is selected, the driving waveform signal WA is separated from the time division multiplex signal; the driving waveform signal WA is inputted to the actuator 88; and the actuator 88 is driven. In a case that the synchronization signal D is selected, the driving waveform signal WD is separated from the time division multiplex signal; the driving waveform signal WD is inputted to the actuator 88; and the actuator 88 is driven.

Figure 14:
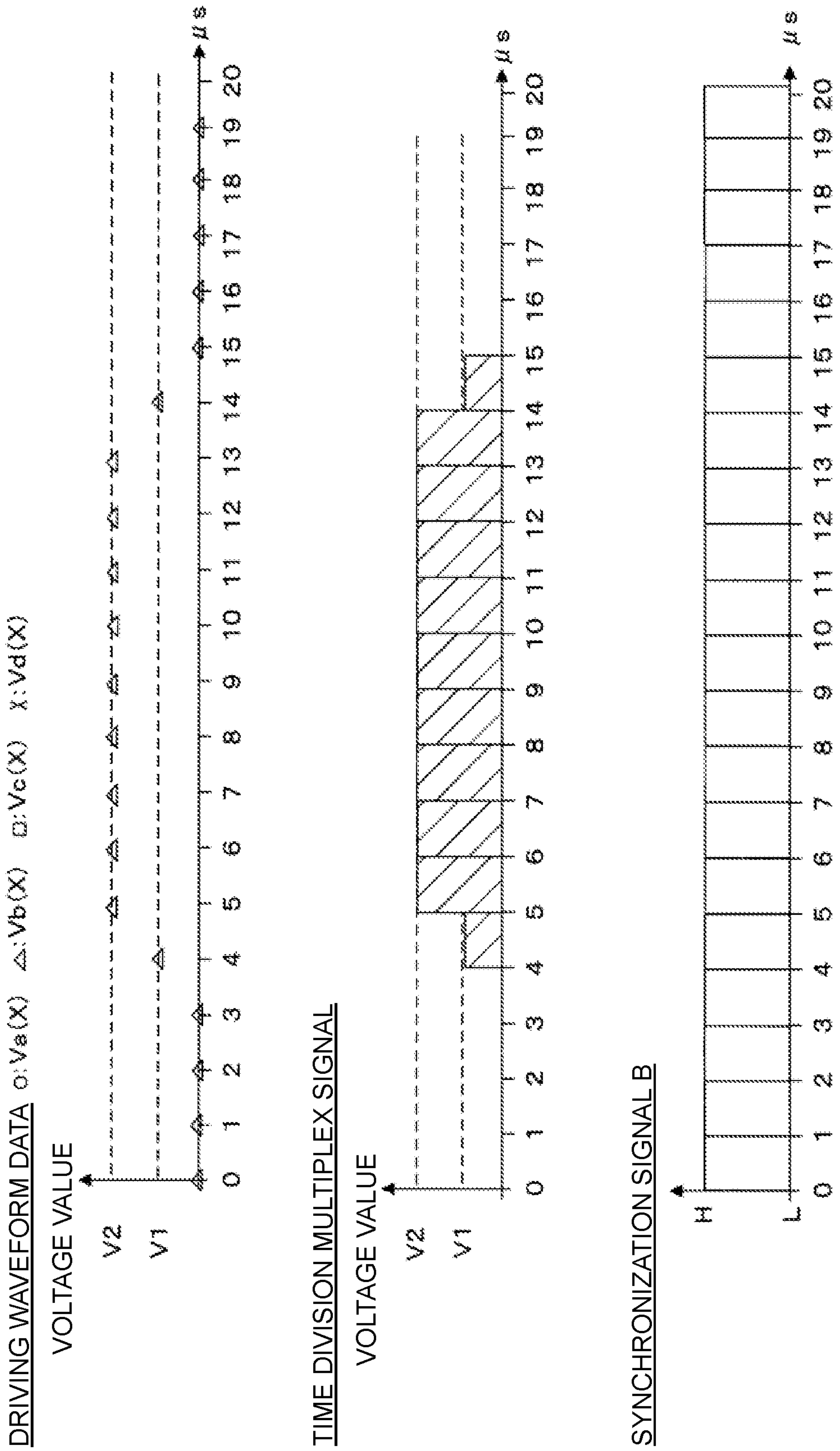
FIG. 14 is a graph of driving waveform data of one cycle which is plotted in time series, a graph depicting a time division multiplex signal, and a graph depicting a synchronization signal in a case of executing a first printing.

A case of executing a first printing in the overlapping printing will be explained. FIG. 14 includes a graph of driving waveform data Db of one cycle plotted in time series, a graph indicating a time division multiplex signal, and a graph indicating a synchronization signal B in a case of executing the first printing. As depicted in the upper view of FIG. 14, the one driving waveform data Db is used. The voltage value Vb(X) is inputted from the voltage table $T_{vb}$ to the selector circuit 60, and the time tb(X) is inputted from the time table $T_{tb}$ to the selector circuit 60. As described above, the voltage value Vb(X) and the time tb(X) are associated with each other via the address X. Note that in a case of executing the second printing, four driving waveform data Da to Dd are used. Since the first printing is for printing a background, and is not required to realize a high quality printing as compared with the second printing, it is possible to reduce the number of the driving waveform data to be used in the first printing. In other words, in a case of executing the overlapping printing, the controller 50 is configured such that a number of the driving waveform data to be selected by the controller 50 for the first printing is smaller than a number of the driving waveform data to be selected by the controller 50 for the second printing. The reference frequency is inputted from the frequency generating circuit 58 to the selector circuit 60. Note that it is allowable to use two or three pieces of the driving waveform data in the first printing.

In a case that a print job indicating the first printing is inputted, the CPU 51*a* associates TS1 and the voltage value Vb(X) with each other and outputs TS1 and the voltage value Vb(X) which are associated with each other to the selector circuit 60. As depicted in the middle view of FIG. 14, the selector circuit 60 refers to the voltage value Vb(X) and TS1 inputted from the CPU 51*a*, selects the one voltage value Vb(X) inputted from the voltage table $T_{vb}$, selects the one time tb(X) inputted from the time table $T_{tb}$, and generates, at every 1 μs, and based on TS1 and the reference frequency, a signal of which voltage value becomes to be the voltage value Vb(X) during a period of time from the point of time k μs to the point of time k+1 μs (in this embodiment, k=1, 2, . . . , 19). Namely, during one cycle of the time division multiplex signal, the number of the driving waveform data to be used for generating the time division multiplex signal is 1 (one), and the number is not changed.

The CPU Ma outputs TS1 to the synchronization signal generating circuit 62*b*. As depicted in the lower view of FIG. 14, the synchronization signal generating circuit 62*b* generates, at every 1 μs, a signal which becomes to be of the high level during the period of time from the point of time k μs to the point of time k+1 μs, thereby generating the synchronization signal B. Based on the synchronization signal B, the driving waveform signal WB is separated from the time division multiplex signal; the driving waveform signal WB is inputted to the actuator 88; and the actuator 88 is driven.

Figure 15A:
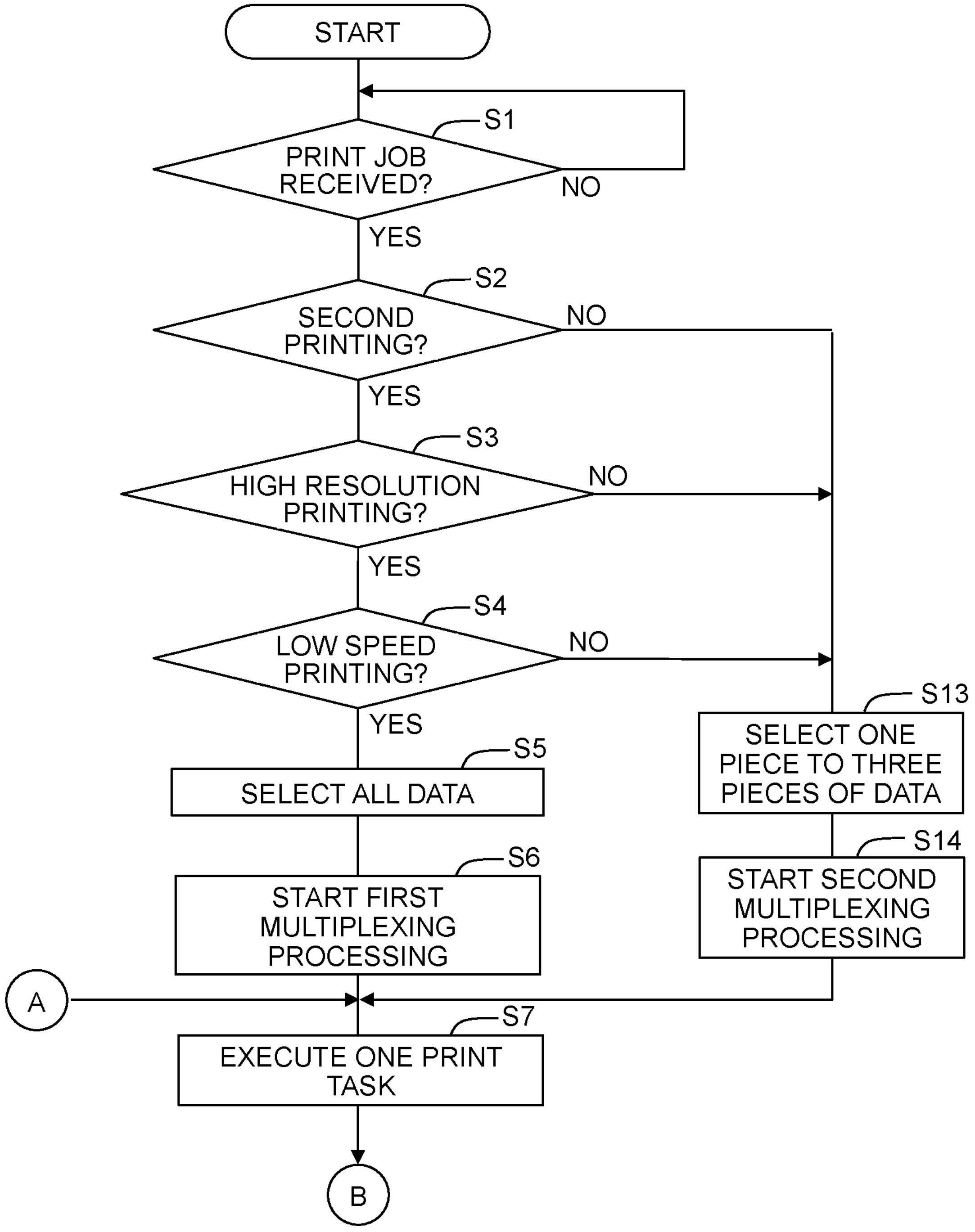
FIG. 15A and FIG. 15B are flow charts explaining a printing processing by a CPU.
Figure 15B:
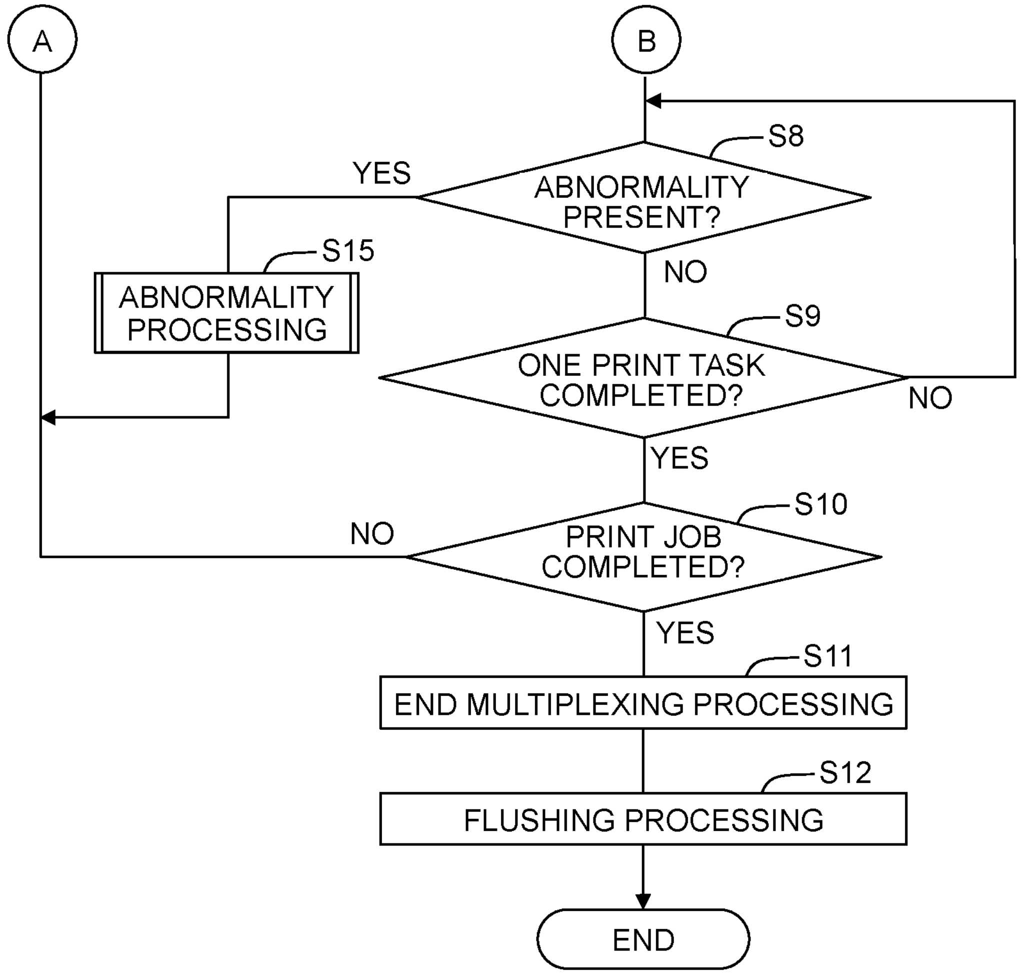

FIG. 15A and FIG. 15B are flow charts explaining a printing processing by the CPU 51*a*. The CPU 51*a* determines whether or not the print job is received from the external device 100 (step S1). In a case that the print job is not received (step S1: NO), the CPU 51*a* returns the process to step S1. In a case that the print job is received (step S1: YES), the CPU 51*a* determines whether or not the received print job is the second printing (step S2). In a case that the print job is the second printing (step S2: YES), the CPU 51*a* determines whether or not the received print job is the high resolution printing (step S3). In a case that the print job is the high resolution printing (step S3: YES), the CPU 51*a* determines whether or not the received print job is the low speed printing (step S4). In a case that the print job is the low speed printing (step S4: YES), the CPU 51*a* selects all the driving waveform data Da to Dd (step S5), and starts a first multiplexing processing (step S6). The first multiplexing processing is a generation processing of generating the time division multiplex signal and a separation processing of separating the driving waveform signal from the time division multiplex signal, as described in the first and second embodiments.

The CPU 51*a* executes one print task (step S7). A print task is a unit constructing the print job. Specifically, the print task is a liquid discharging processing which is performed during a period of time wherein the ink-jet head 8 is (being) moved rightward or leftward by a distance corresponding to a left-right width of the recording paper 200. Next, the CPU 51*a* determines whether or not abnormality is occurred during the print task (step S8). The abnormality is, for example, paper jam. In a case that abnormality is occurred during the print task (step S8: YES), the CPU 51*a* executes an abnormality processing (step S15). The details of the abnormality processing will be described later on.

In a case that abnormality is not occurred during the print task (step S8: NO), the CPU 51*a* determines whether or not the one print task is completed (step S9). Note that in the one print task, the carriage 6 performs one scanning (scans one time). In a case that the one print task is not completed (step S9: NO), the CPU 51*a* returns the process to step S8. In a case that the one print task is completed (step S9: YES), the CPU 51*a* determines whether or not the print job is completed (step S10). In a case that the print job is not completed (step S10: NO), the CPU 51*a* returns the process to step S7, and executes a next one print task. In a case that the print job is completed (step S10: YES), the CPU 51*a* completes the first multiplexing processing or a second multiplexing processing which will be described later on (step S11), and executes a flushing processing (step S12). The flushing processing is a processing in which the ink is discharged from the nozzles 80 for any purpose other than the purpose of the printing. The flushing process is executed, for example, at the flushing receiver 21. After executing the flushing processing, the CPU 51*a* ends the print processing.

In a case that the print job is not the second printing in step S2 (step S2: NO), namely, that the print job is the first printing, in a case that the print job is not the high resolution printing in step S3 (step S3: NO), namely, that the print job is the low resolution printing, or in a case that the print job is not the low speed printing in step S4 (step S4: NO), namely, that the print job is the high speed printing, the CPU 51*a* selects one piece to three pieces of the driving waveform data corresponding to the print method (step S13), and starts a second multiplexing processing (step S14). The second multiplexing processing is a generation processing of generating the time division multiplex signal and a separation processing of separating the driving waveform signal from the time division multiplex signal, as described in the third embodiment. After executing step S14, the CPU 51*a* proceeds the process to step S7.

Figure 16:
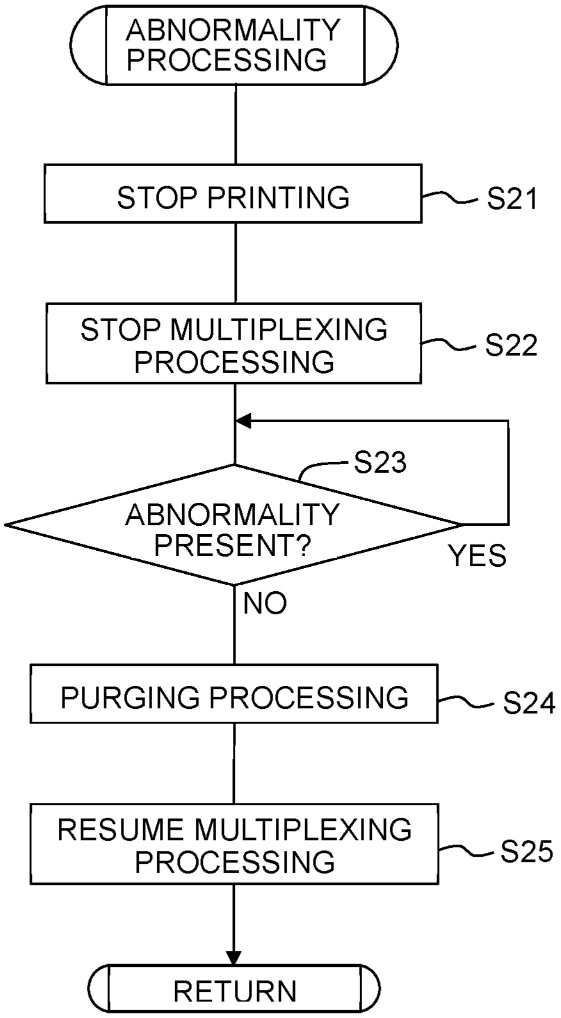
FIG. 16 is a flow chart explaining an abnormality processing by the CPU.

FIG. 16 is a flow chart explaining an abnormality processing by the CPU 51*a*. Note that the abnormality processing may be executed by a CPU which is different from the CPU 51*a*. In a case that the CPU 51*a* (an example of "abnormality determiner") determines in step S8 that there is an abnormality (step S8: YES), the CPU 51*a* stops the printing (step S21), and stops the first multiplexing processing or the second multiplexing processing (step S22). Namely, the CPU 51*a* stops the generation of the time division multiplex signal and the separation of the driving waveform signal. Further, the CPU 51*a* determines whether or not there is any abnormality (step S23). In a case that there is an abnormality (step S23: YES), namely, for example, in a case that the paper jam is not dissolved, the CPU 51*a* returns the process to step S23. In a case that there is no abnormality (step S23: NO), the CPU 51*a* executes a purging processing (step S24). The purging processing is a processing of causing a non-illustrated pump to perform suction of the ink. The CPU 51*a* resumes the first multiplexing processing or the second multiplexing processing (step S25), and returns the process to step S7.

In the printing apparatus 1 according to the third embodiment, the driving waveform data as mush as the number (quantity) depending on the print method is/are selected from the plurality of pieces of waveform driving data. Therefore, it is possible to reduce the number of the driving waveform data to be used for the printing, to reduce the number of the synchronization signal as compared with a case of using all of the plurality of pieces of the driving waveform data, to make the switching frequency in the switch group 54 to be small, and to suppress any generation of noise and any increase in the power consumption.

The embodiments disclosed herein are examples in all senses, and should be interpreted not restrictive or limiting in any way. The technical features described in the respective embodiments can be combined with each other, and the scope of the present invention is intended to encompass all the changes within the scope of the claims and a scope equivalent to the scope of the claims.

What is claimed is:

1. A printing apparatus comprising:

a nozzle configured to discharge a liquid by an energy generating element;

a selector configured to select, based on a print job, at least two driving waveforms corresponding to a printing method indicated by the print job, from a plurality of driving waveforms different from each other, the at least two driving waveforms including a first driving waveform and a second driving waveform;

a signal generator configured to generate a time division multiplex signal based on data indicating the at least two driving waveforms selected by the selector; and a separator configured to separate a first driving waveform signal indicating the first driving waveform or a second driving waveform signal indicating the second driving waveform from the time division multiplex signal generated by the signal generator, wherein the energy generating element is configured to be driven by the first driving waveform signal or the second driving waveform signal separated by the separator; and in the time division multiplex signal, a third portion being a part of the second driving waveform is aligned between a first portion being a part of the first driving waveform and a second portion being another part of the first driving waveform, and the second portion is aligned between the third portion and a fourth portion being another part of the second driving waveform.

2. The printing apparatus according to claim 1, wherein a plurality of the data is to be used by the signal generator in each of a plurality of period of times included in one cycle of the time division multiplex signal, and wherein a number of the data to be used by the signal generator in each of the plurality of period of times included in the one cycle of the time division multiplex signal is not changed over the plurality of period of times.

3. The printing apparatus according to claim 2, wherein the selector is configured to select the at least two driving waveforms as many as a first number in a case that the printing method indicated by the print job is a low resolution printing, and wherein the selector is configured to select the at least two driving waveforms as many as a second number in a case that the printing method indicated by the print job is a high resolution printing, the first number being smaller than the second number.

4. The printing apparatus according to claim 2, wherein the printing method to be indicated by the print job includes an overlapping printing including performing a first printing on a print medium and then performing a second printing overlappingly on a part of the print medium, the first printing having been performed on the part of the print medium, wherein, in a case that the printing method indicated by the print job is the overlapping printing, the selector is configured to select the at least two driving waveforms as many as a third number for the first printing, and to select the at least two driving waveforms as many as a fourth number for the second printing, the third number being smaller than the fourth number.

5. The printing apparatus according to claim 2, wherein the selector is configured to select the at least two driving waveforms as many as a fifth number in a case that the printing method indicated by the print job is a high speed printing, and wherein the selector is configured to select the at least two driving waveforms as many as a sixth number in a case that the printing method indicated by the print job is a low speed printing, the fifth number being smaller than the sixth number.

6. The printing apparatus according to claim 1, wherein both a first period of time and a second period of time are included in a same one cycle of the time division multiplex signal, wherein the second period of time does not overlap with the first period of time, and wherein a number of the data to be used by the signal generator so as to generate the time division multiplex signal during the first period of time is smaller than a number of the data to be used by the signal generator so as to generate the time division multiplex signal during the second period of time.

7. The printing apparatus according to claim 6 comprising a switcher, wherein the data includes at least first data indicating the first driving waveform and second data indicating the second driving waveform different from the first driving waveform;

the first driving waveform indicates a first voltage value including values aligned in time series, and the second driving waveform indicates a second voltage value including values aligned in time series;

in a case that the first voltage value indicated by the first driving waveform is same as the second voltage value indicated by the second driving waveform at a first change point of time, the switcher is configured to select the first data or the second data, the first voltage value indicated by the first driving waveform being changed from one value to other value at the first change point of time, and in a case that the first voltage value indicated by the first driving waveform is same as the second voltage value indicated by the second driving waveform at a second change point of time, the switcher is configured to select the first data or the second data, the second voltage value indicated by the second driving waveform being changed from one value to other value at the second change point of time.

8. The printing apparatus according to claim 7, wherein the selector includes the switcher.

9. The printing apparatus according to claim 7, comprising:

a memory; and a comparing circuit configured to:

obtain the first voltage value indicated by the first driving waveform at the first change point of time and the second voltage value indicated by the second driving waveform at the first change point of time from the memory;

compare the first and second voltage values at the first change point of time obtained from the memory and output a first result of the comparing of the first and second voltage values at the first change point of time;

obtain the first voltage value indicated by the first driving waveform at the second change point of time and the second voltage value indicated by the second driving waveform at the second change point of time from the memory; and compare the first and second voltage values at the second change point of time obtained from the memory and output a second result of the comparing of the first and second voltage values at the second change point of time;

wherein the switcher includes a selection signal outputting circuit configured to:

output a signal for selecting the first data or the second data in a case that the first result indicates that the first and second voltage values at the first change point of time are same as each other or the second result indicates that the first and second voltage values at the second change point of time are same as each other, and output a signal for selecting both of the first data and the second data in a case that the first result indicates that the first and second voltage values at the first change point of time are different from each other or the second result indicates that the first and second voltage values at the second change point of time are different from each other; and the signal generator includes a selector circuit configured to obtain the signal outputted from the selection signal outputting circuit, and configured to select the first data or the second data or configured to select both of the first data and the second data, based on the obtained signal.

10. The printing apparatus according to claim 6, wherein the data includes at least first data indicating the first driving waveform and second data indicating the second driving waveform different from the first driving waveform;

the first driving waveform indicates a first voltage value including values aligned in time series, and the second driving waveform indicates a second voltage value including values aligned in time series;

a voltage value indicating a driving waveform different from the first driving waveform and the second driving waveform is not present between the first voltage value indicated by the first driving waveform and the second voltage value indicated by the second driving waveform;

the printing apparatus comprises:

a frequency generating circuit configured to generate a reference frequency; and a switcher, every time one cycle of the reference frequency generated by the frequency generating circuit elapses, in a case that the first voltage value indicated by the first driving waveform is same as the second voltage value indicated by the second driving waveform, the switcher is configured to select the first data or the second data, and every time one cycle of the reference frequency generated by the frequency generating circuit elapses, in a case that the first voltage value indicated by the first driving waveform is different from the second voltage value indicated by the second driving waveform, the switcher is configured to select both of the first data and the second data.

11. The printing apparatus according to claim 10, wherein the selector includes the switcher.

12. The printing apparatus according to claim 6, wherein the separator is configured to separate the first driving waveform signal or the second driving waveform signal from the time division multiplex signal by a first sampling frequency corresponding to the number of the data to be used to generate the time division multiplex signal during the first period of time, and to separate the first driving waveform signal or the second driving waveform signal from the time division multiplex signal by a second sampling frequency corresponding to the number of the data to be used to generate the time division multiplex signal during the second period of time, the second sampling frequency being greater than the first sampling frequency.

13. The printing apparatus according to claim 1 comprising:

an abnormality determiner configured to determine whether or not abnormality is occurred during print task; and a stopper configured to stop generation of the time division multiplex signal by the signal generator and separation of the first driving waveform signal or the second driving waveform signal by the separator in a case that the abnormality determiner determines that the abnormality is occurred during print task.

14. A printing apparatus comprising:

a nozzle configured to discharge a liquid by an energy generating element;

a signal generator configured to generate a time division multiplex signal, transmittable via a single signal line, based on a plurality of pieces of data each indicating one of a plurality of driving waveforms different from each other; and a separator configured to separate a driving waveform signal indicating the one of the plurality of driving waveforms from the time division multiplex signal generated by the signal generator;

wherein both a first period of time and a second period of time are included in a same one cycle of the time division multiplex signal, wherein the second period of time is different from the first period of time, wherein a number of the data to be used by the signal generator so as to generate the time division multiplex signal during the first period of time is smaller than a number of the data to be used by the signal generator so as to generate the time division multiplex signal during the second period of time, and wherein the energy generating element is configured to be driven by the driving waveform signal separated by the separator.

* * * * *